(12) United States Patent
Baig et al.

(10) Patent No.: US 12,364,955 B2
(45) Date of Patent: Jul. 22, 2025

(54) POLYPYRROLE CERAMIC-POLYMERIC POROUS MEMBRANE FOR SEPARATING AN OIL AND WATER MIXTURE

(71) Applicant: KING FAHD UNIVERSITY OF PETROLEUM AND MINERALS, Dhahran (SA)

(72) Inventors: Umair Baig, Dhahran (SA); Abdul Waheed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 377 days.

(21) Appl. No.: 18/179,791

(22) Filed: Mar. 7, 2023

(65) Prior Publication Data

US 2024/0299886 A1    Sep. 12, 2024

(51) Int. Cl.

| | |
|---|---|
| *B01D 69/10* | (2006.01) |
| *B01D 71/02* | (2006.01) |
| *B01D 71/62* | (2006.01) |
| *C02F 1/28* | (2023.01) |
| *C02F 101/32* | (2006.01) |
| *C02F 103/00* | (2006.01) |

(52) U.S. Cl.
CPC ......... *B01D 69/108* (2022.08); *B01D 71/025* (2013.01); *B01D 71/62* (2013.01); *C02F 1/285* (2013.01); *C02F 1/288* (2013.01); *B01D 2257/7027* (2013.01); *C02F 2101/32* (2013.01); *C02F 2103/007* (2013.01)

(58) Field of Classification Search
None
See application file for complete search history.

(56) References Cited

FOREIGN PATENT DOCUMENTS

| | | |
|---|---|---|
| CN | 206435057 U | 8/2017 |
| CN | 110055567 B | 5/2021 |
| CN | 114843698 A | 8/2022 |
| WO | WO 2017/140279 A1 | 8/2017 |
| WO | WO 2021/250515 A1 | 12/2021 |

OTHER PUBLICATIONS

Hassanzadeh et al. Chemical synthesis of high density and long polypyrrole nanowire arrays using alumina membrane and their hydrogen sensing properties, Superlattices and Microstructures 51 (2012) 314-323 (Year: 2012).*

Yahua Bao, et al., "Conductive, Polypyrrole Coating on Mullite/Alumina Fibers for Electrophoretic Deposition of Oxide Matrices", Journal of the American Ceramic Society, vol. 87, Issue 9, Jul. 7, 2008, pp. 1767-1770 (Abstract only).

Negin Ghaemi, et al., "Enhancement in copper ion removal by PPy@$Al_2O_3$ polymeric nanocomposite membrane", Journal of Industrial and Engineering Chemistry, vol. 40, Aug. 25, 2016, pp. 26-33 (Abstract only).

* cited by examiner

*Primary Examiner* — Krishnan S Menon
(74) *Attorney, Agent, or Firm* — Oblon, McClelland, Maier & Neustadt, L.L.P.

(57) ABSTRACT

A method of separating an oil and water mixture including contacting the oil and water mixture with a membrane, where only the water in the oil and water mixture passes through the membrane. The membrane includes an alumina support and polypyrrole. A layer of the polypyrrole is hydrogen bonded to an outer layer of the alumina support, where particles of the polypyrrole are in the form of globules having a longest dimension of 100 to 300 nm.

20 Claims, 20 Drawing Sheets

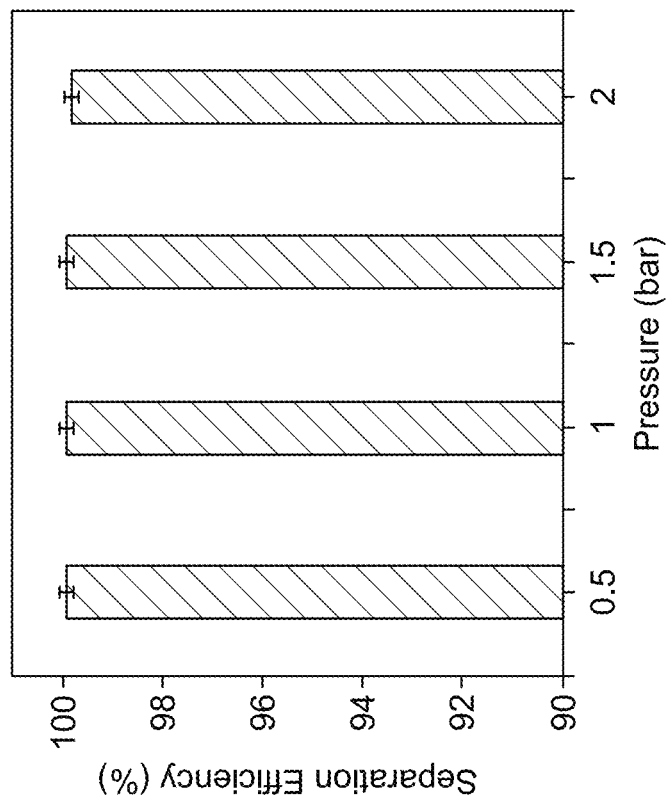
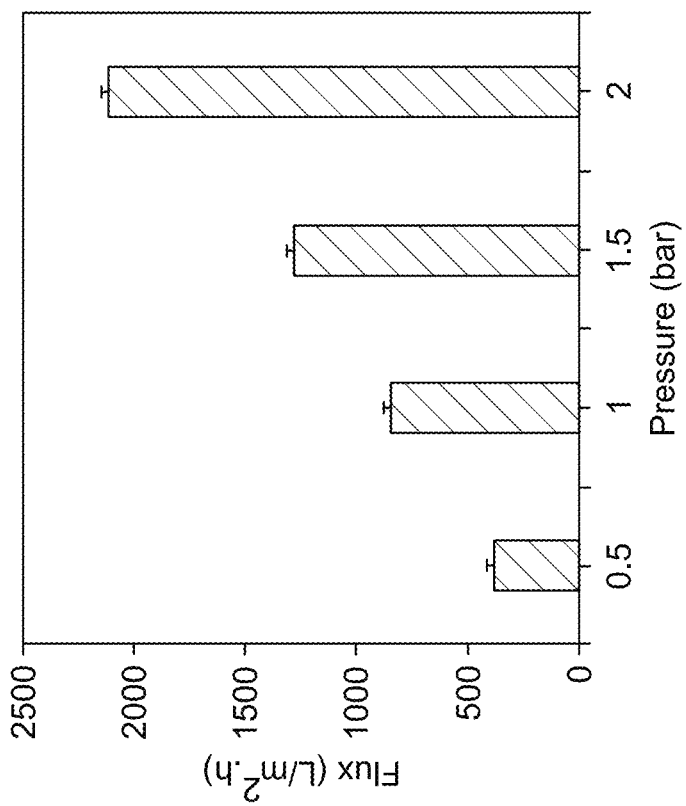
FIG. 10A
FIG. 10B

POLYPYRROLE CERAMIC-POLYMERIC POROUS MEMBRANE FOR SEPARATING AN OIL AND WATER MIXTURE

STATEMENT OF PRIOR DISCLOSURE BY INVENTOR

Aspects of the present disclosure are described in U. Baig, and A. Waheed "An efficient and simple strategy for fabricating a polypyrrole decorated ceramic-polymeric porous membrane for purification of a variety of oily wastewater streams"; Environmental Research; Dec. 16, 2022; 219, 114959, incorporated herein by reference in its entirety.

STATEMENT OF ACKNOWLEDGEMENT

The support provided by the IRC for Membranes and Water Security through project #INMW2207, King Fahd University of Petroleum and Minerals, Saudi Arabia, is gratefully acknowledged.

BACKGROUND

Technical Field

The present disclosure is directed to a membrane, particularly a polypyrrole-ceramic-polymeric porous membrane for separating an oil and water mixture.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Produced water (PW) is generated during the drilling of oil and has a varied composition dependent upon the geological location of the oil drilling site. Generally, PW is composed of dissolved organics (phenols, aldehydes, fatty acids, aliphatic and aromatic organic compounds), process chemicals (imidazoline, phosphate ester, glycol, and methanol), heavy metals and radioactive materials (cadmium, chrome, copper, lead, radium, silver, and zinc) and suspended solids (siliceous and calcareous, calcium carbonate, asphaltenes, paraffin, suspended oil, and sulfate-reducing bacteria). Treatment of PW is necessary for its disposal, as international agreements and conventions for protecting marine and aquatic life do not permit the direct discharge of untreated PW into water bodies. Also, the recovery of clean water from waste PW can meet the water requirements of the oil and gas industry. Hence, the proper treatment of PW can convert PW waste into a valuable resource.

Various strategies have been explored to treat PW. For instance, the American Petroleum Institute (API) Separator has been used for several years for the separation of suspended oil from PW. Similarly, the Dissolved Air Floatation (DAF) has also been widely used in industry for treating PW by removing smaller droplets of oil by allowing air to enhance the buoyancy of oil (Piccioli, M. et al., 2020. Gas flotation of petroleum-produced water: a review on status, fundamental aspects, and perspectives. Energy Fuels 34, 15579-15592). The conventional techniques are inefficient in removing dissolved and emulsified oil from the PW, therefore membrane-based separation has emerged as a promising and efficient alternative to traditional PW technologies.

The features of membrane-based separation are ease of operation, freedom of tuning the membrane performance, availability of a variety of modules, low energy requirements, smaller footprint, cleaner products, availability of a variety of membrane supports and polymers, and applicability in different dimensions. Different membranes, such as polymeric and ceramic membranes, have been used for the purification of different feeds such as oil/water (O/W) emulsion, oily wastewaters, saline water, and pollutants-containing feeds. Different additives have been added to prepare mixed matrix membranes (MMMs) to enhance the performance of the polymeric ultrafiltration membranes. Additives such as clay, polymeric materials, and nanomaterials, have been explored to improve membrane separation performance.

Polymeric membranes suffer from drawbacks, including excessive membrane fouling and lower stability under harsh operating conditions. Similarly, additives cannot survive the filtration performance as additives can be eventually washed out under increased feed pressures. Therefore, ceramic membranes have emerged as a promising choice for durable operation during filtration performance tests. Ceramic membranes have several advantages, such as being stable under harsh operating conditions of high temperatures and varied pH ranges of feeds. Moreover, ceramic membranes also equip the users with the facility of tuning membrane structure by utilizing different ceramic materials such as zirconia ($ZrO_2$), titania ($TiO_2$), alumina ($Al_2O_3$), and metal carbides such as silicon carbide (SiC).

Standalone ceramic membranes have certain disadvantages, such as high temperature sintering therefore, chemical binders are added to enhance particle binding during membrane fabrication. However, the requirements of high sintering temperatures and binders for ceramic membrane fabrication make ceramic membrane fabrication a costly process. Similarly, tuning ceramic membranes performance is not straightforward, as several parameters may have to be defined.

Therefore, a method for fabricating ceramic-polymeric composite membranes for O/W emulsion separation is needed for making improved oil separation membranes for separating oil-in-water emulsions. Accordingly, an object of the present disclosure is to provide methods for making and using a membrane for oil water separation.

SUMMARY

In an exemplary embodiment, a method of separating an oil and water mixture is described. The method includes contacting the oil and water mixture with a membrane, where only the water in the oil and water mixture passes through the membrane. The membrane includes an alumina support; and a polypyrrole of formula (I); wherein in formula (I) R is selected from the group consisting of a hydrogen, an alcohol, a carboxylic acid, and a glycol having 2 to 5 carbon atoms, wherein in formula (I) n is an integer from 1 to 500. A layer of the polypyrrole is hydrogen bonded to an outer layer of the alumina support, where particles of the polypyrrole are in the form of globules having a longest dimension of 100 to 300 nanometers (nm).

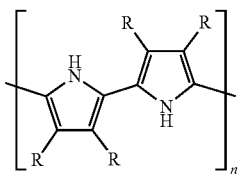

(I)

In some embodiments, the layer of polypyrrole has a thickness of 100 to 500 nm.

In some embodiments, the particles of the polypyrrole are interconnected and form a continuous network along the surface of the alumina support.

In some embodiments, the network has regularly spaced protrusions from the surface of the alumina support, and the protrusions are spaced 300 to 800 nm apart.

In some embodiments, the layer of polypyrrole is uniform on the alumina support.

In some embodiments, the polypyrrole has a weight average molecular weight of 5,000-100,000 gram per mole (g/mol).

In some embodiments, the membrane consists of the polypyrrole and the alumina support.

In some embodiments, the membrane comprises 10-20 wt. % C, 1-5 wt. % N, 20-30 wt. % O, and 50-60 wt. % Al, based on a total weight of the membrane.

In some embodiments, the alumina support comprises alumina particles having an average size of 1 to 10 μm, wherein the alumina particles have a γ form, and wherein the alumina particles are dispersed to form a structure with pores having a largest dimension of 0.2 to 3 micrometers (μm).

In some embodiments, the membrane has pores with a largest dimension of 0.1 to 2 μm.

In some embodiments, the membrane has a porosity of 30-40%.

In some embodiments, the membrane has a water contact angle of less than 5° in air.

In some embodiments, the membrane has an oil contact angle of less than 5° in air.

In some embodiments, the membrane has an underwater oil contact angle greater than 150°.

In some embodiments, the membrane has an underwater oil contact angle of 155° to 165°.

In some embodiments, the membrane has a permeate flux of at least 1,000 liters per meter square per hour (L m$^{-2}$h$^{-1}$) at a pressure of 2 bar.

In some embodiments, the membrane has a separation efficiency of at least 95% at a pressure of 0.1 to 5 bar.

In some embodiments, the oil is at least one selected from the group consisting of toluene, hexane, cyclohexane, dichloromethane, plant oil, isooctane, lubricating oil, motor oil, crude oil, diesel oil, and gasoline.

In some embodiments, the oil and water mixture is wastewater, produced water, or seawater after an oil spill.

In some embodiments, a method of making the membrane is described. The method includes mixing an aqueous solution of sodium dodecyl sulfate and the alumina support to form a mixture; mixing pyrrole in the mixture to form a second mixture; and adding a polymerization agent to the second mixture to form the membrane.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10A shows the effect of transmembrane pressure on permeate water flux of the PPy-coated alumina ceramic membrane, according to certain embodiments;

FIG. 10B shows the separation efficiency of the PPy-coated alumina ceramic membrane using 125 ppm diesel oil-in-water emulsion at different transmembrane pressures, according to certain embodiments;

DETAILED DESCRIPTION

Figure 1:
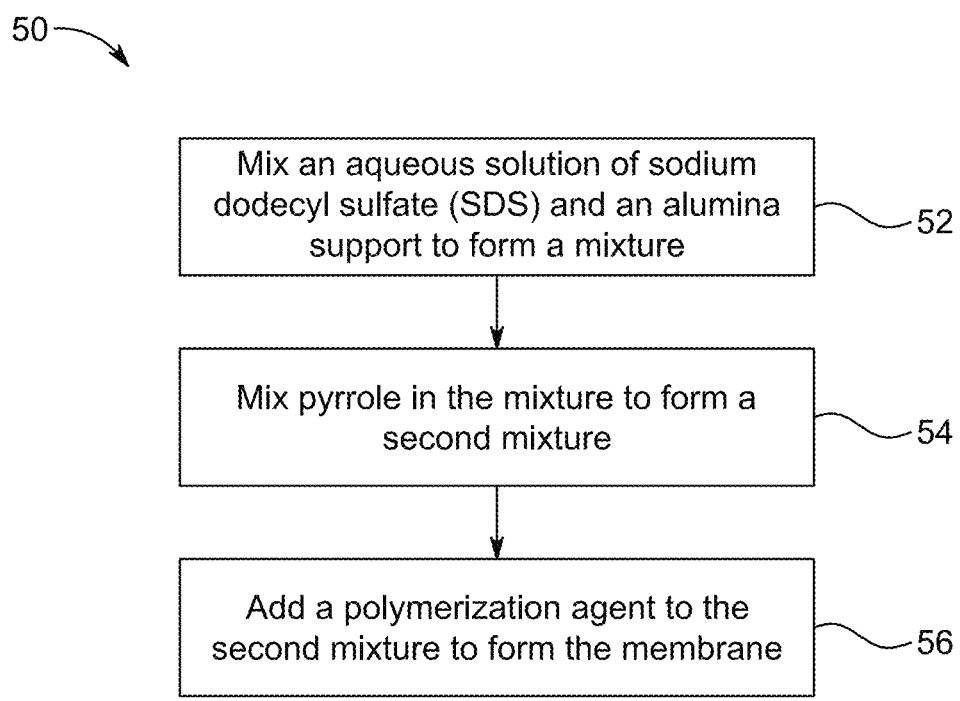
FIG. 1 is a flowchart depicting a method of separating an oil and water mixture, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

As used herein, the term 'water contact angle' refers to the angle conventionally measured through the liquid, where a liquid-vapor interface meets a solid surface. The water contact angle quantifies the wettability of a solid surface by a liquid via the Young's equation. If the measured contact angle is above 90 degrees, the solid is said to have poor wetting and is termed hydrophobic. If the contact angle is below 90 degrees, the solid is said to have efficient wetting and is termed hydrophilic.

As used herein, the term 'superhydrophilicity' refers to the phenomenon of excess hydrophilicity, or attraction to water; in superhydrophilic materials, the contact angle of water is approximately zero degrees.

As used herein, the term 'superoleophilicity' refers to the phenomenon of excess oleophilicity, or attraction to oil; in superoleophilic materials, the contact angle of oil is approximately zero degrees.

As used herein, the term 'superoleophobicity' refers to the phenomenon where the contact angles of various oil droplets with low surface tension on a solid surface are larger than 150°.

As used herein, the term 'water flux' refers to the product of inundation depth, the width of the channel, and depth-averaged current velocity.

As used herein, the term 'separation efficiency' refers to the ratio of concentration that has been removed from the feed stream to the initial concentration in the feed stream.

Aspects of the present disclosure are directed to a membrane and a method for separating an oil and water mixture. The membrane of the present disclosure allows for the separation of oil from water by selectively enabling the passage of water, leaving behind the oil, when the oil and water mixture is passed through the membrane. To bring about such a separation, it is desirable for the membrane to have a hydrophilic character.

A method for separating an oil and water mixture is described. The method includes contacting the oil and water mixture with a membrane, where only the water in the oil and water mixture passes through the membrane. In some embodiments, the oil and water mixture is produced water, wastewater or seawater after an oil spill. It may be understood by a person skilled in the art that the source of the wastewater or seawater can be a transport and fuel depot, refinery processes such as cooling water, condensed stripping steam, tank draw-off, and contact process water; and oil industry waste, oil refining waste, oil storage waste.

In some embodiments, the oil and/or oil phase contains at least one selected from the group consisting of toluene, hexane, cyclohexane, dichloromethane, plant oil, isooctane, lubricating oil, crude oil, diesel oil, and gasoline. In some embodiments, the oil may include, but is not limited to, ethylbenzene, methylene chloride, or various mixtures. Although the examples herein provided refer to the use of motor oil, diesel oil, or crude oil, it may be noted that the membrane of the present disclosure is effective in separating any oil and water mixture, particularly low molecular weight oils/aliphatic oils. In some embodiments, the oils contain polyaromatic hydrocarbons and/or aliphatic hydrocarbons. In a preferred embodiment, the oil contains only aliphatic hydrocarbons.

The membrane includes a ceramic material as the main structural support for the membrane. In some embodiments, the ceramic material may include silica, silicon carbide, tungsten carbide, zirconia, alumina, zinc oxide, titania and combinations thereof. In a preferred embodiment, the ceramic material is alumina ($Al_2O_3$).

In some embodiments, the alumina support includes alumina particles in the form of nanocrystalline powders. In a preferred embodiment, the alumina particles have an average size of 1 to 10 μm, preferably 2 to 9 μm, 3 to 8 μm, 4 to 7 μm, or 5 to 6 μm. The alumina particles are dispersed to form a structure with pores having the largest dimension of 0.2 to 3 μm, preferably in a range of 1 to 2 μm. The alumina particles in the alumina support may be similarly or differently sized. The alumina particles may exist in different forms, such as alpha-alumina, delta-alumina, gamma-alumina, or combinations thereof, in the alumina support. In a preferred embodiment, the alumina support has alumina particles in a γ form. γ-$Al_2O_3$ is formed by heating boehmite AlO(OH) between 400 and 500° C. It has a specific surface area >100 $m^2$/g, preferably 100-300 $m^2$/g. Upon heating, adjacent OH groups can react to release water. The support may be adapted to form microfiltration, nanofiltration, or ultrafiltration support. In an embodiment, the alumina support is an ultrafiltration support.

Optionally, the alumina support may include other particles such as titania ($TiO_2$), silica ($SiO_2$), zirconia ($SiO_2$), or a mixture of these materials. In some embodiments, the support may include a combination of these materials—for example: $Al_2O_3$—$ZrO_2$. In an embodiment, the alumina support may include one or more layers, with each layer having alumina particles of different pore sizes. In an embodiment, each layer from one or more layers may be made of the same or different material. For example, a first layer may be made of $Al_2O_3$ material, while a second layer in the alumina support may be made up of $Al_2O_3$—$ZrO_2$. The alumina support may exist in different shapes—such as tubular, monolith, hollow fiber, and flat sheet.

The membrane further includes at least one layer of a polymer on the alumina support. In some embodiments, there are 1-10 layers of the polymer, preferably 2-9, 3-8, 4-7, or 5-6 layers. The polymer, also referred to as the active layer, covers at least 50%, preferably 60%, more preferably 80%, and yet preferably more than 95% of the alumina support. The polymer may be polypyrrole, polythiophene, polyaniline, and polyacetylene or combinations thereof. In a preferred embodiment, the membrane includes at least one layer of polypyrrole that forms the active layer of the membrane. In an embodiment, the layer of polypyrrole is coated uniformly over the entire surface of the alumina support. The active layer includes repeating/polymeric units of pyrrole to form polypyrrole (PPy). In an embodiment, the PPy is a compound of Formula (I):

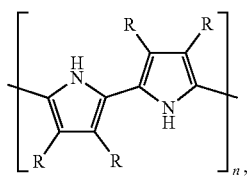

(I)

here, R is selected from the group consisting of a hydrogen, an alcohol, a carboxylic acid, and a glycol having 2 to 5 carbon atoms, and n is an integer from 1 to 500. In some embodiments, the R is an alcohol. The alcohol may include a $C_1$-$C_{20}$ alcohol, preferably $C_1$-$C_{10}$, preferably $C_1$-$C_6$ alcohol. The alcohol may be a linear or a branched chain alcohol. Examples of alcohol include methanol, ethanol, n-propyl alcohol, isopropyl alcohol, and t-butyl alcohol. In some embodiments, R is a carboxylic acid having $C_1$-$C_7$, preferably $C_1$-$C_5$, and more preferably $C_1$-$C_3$ carbon atoms. The carboxylic acid may be a linear or a branched chain carboxylic acid. In some embodiments, the R may be a sulfhydryl group, aldehyde, or an amino group. In some embodiments, R is a $C_1$-$C_5$ alkyl group, optionally substituted with an alcohol, carboxylic acid, amino group, or sulfonic acid group. In a preferred embodiment, the substituent increases the hydrophilicity of the PPy. In some embodiments, the PPy is crosslinked to a hydrophilic polymer such as polysaccharides (e.g., dextran, alginate, chitosan, agarose, and pullulan) and proteins (e.g., albumin, gelatin, collagen, lectin, legumine, and viciline). In a preferred embodiment, R is hydrogen. In some embodiments, the polypyrrole has a weight average molecular weight of 5,000-100,000 g/mol, preferably 10,000-90,000 g/mol, 20,000-80,000 g/mol, 30,000-70,000 g/mol, 40,000-60,000 g/mol or approximately 50,000 g/mol.

Figure 4:
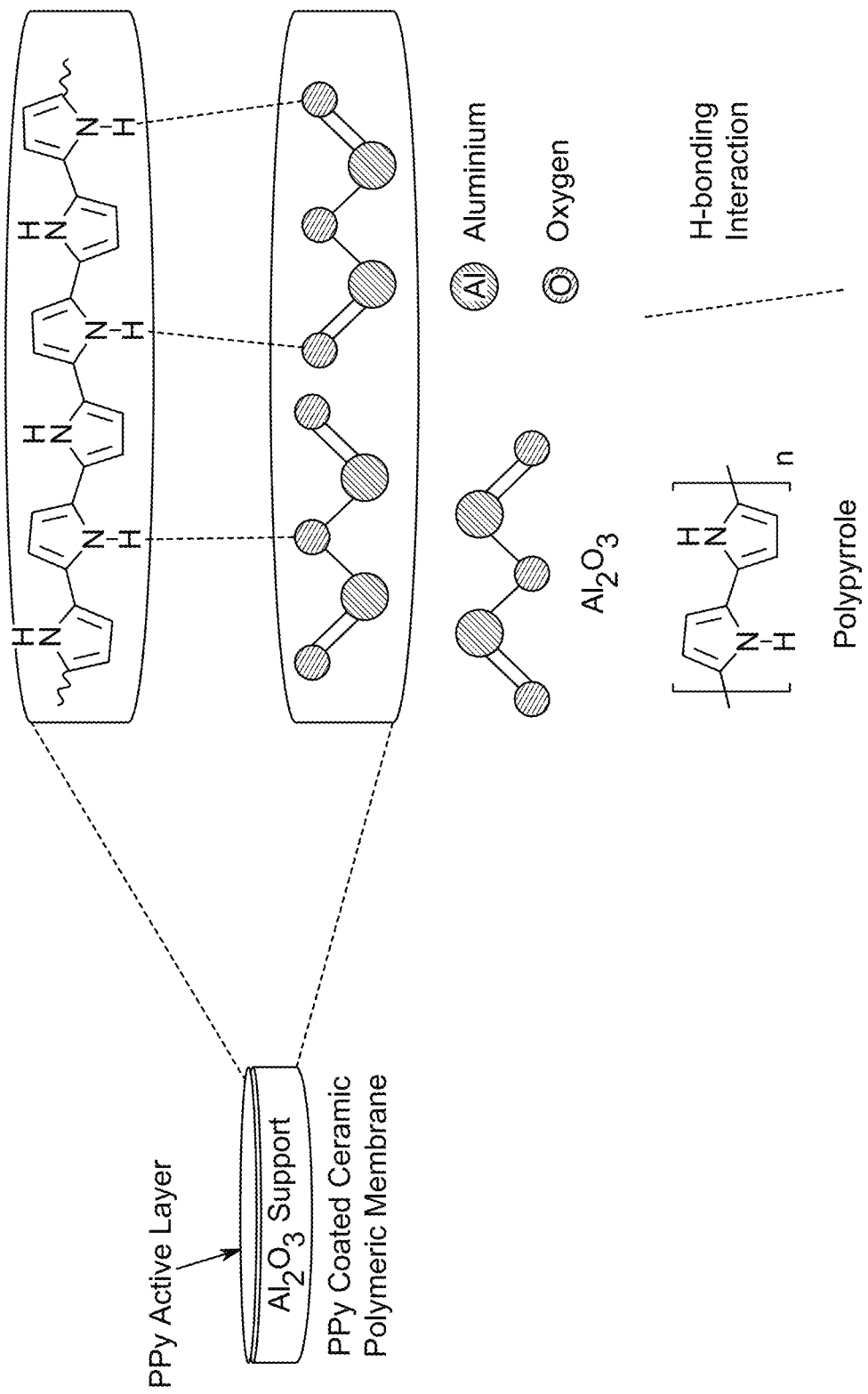
FIG. 4 depicts a possible mechanism of deposition of PPy on an alumina ceramic support, according to certain embodiments.

The active layer or PPy is attached to the alumina support. In an embodiment, the nature of the interaction between the PPy and the alumina support is via hydrogen bonding. PPy is a hydrogen donor and can form intermolecular N—H•••O hydrogen bonding with the oxygen atoms present in the outer layer of the alumina support. An embodiment of the hydrogen bonding is depicted in FIG. 4. In some embodiments, the membrane may include additives that can enhance the compatibility between the alumina support and the PPy in the active layer. In some embodiments, the membrane consists of or consists essentially of the polypyrrole and the alumina support.

In some embodiments, the PPy of the active layer is in the form of particles that are globular in shape. In some embodiments, the PPy of the active layer is in the form of particles that are irregular in shape. In some embodiments, the PPy particles have a longest dimension of 100 to 300 nm, preferably 150 to 250 nm, or approximately 200 nm. In some embodiment, the PPy particles are interconnected and form a continuous network along the surface of the alumina support. In some embodiments, the network displays regularly spaced protrusions from the surface of the support. In some embodiments, the protrusions have a longest dimension of 100 to 700 nm, preferably 200 to 600 nm, or approximately 300 to 500 nm. In some embodiments, the protrusions have a globular shape. In some embodiments, the protrusions have an irregular shape. In some embodiments, the protrusions are spaced 300 to 800 nm apart, preferably 400 to 700 nm, or 500-600 nm.

The membrane comprises 10-20 wt. % C, preferably 12-18 wt. % or 14-16 wt. %, 1-5 wt. % N, preferably 2-4 wt. % or approximately 3 wt. %, 20-30 wt. % O, preferably 22-28 wt. %, or 24-26 wt. %, and 50-60 wt. % Al, preferably 52-58 wt. %, or 54-56 wt. %, based on the total weight of the membrane.

The porosity of the membrane plays a role in the filtration performance of the membrane. It is, therefore, desirable for the membrane to have a particular pore size in the membrane's structure, which specifically allows for the passage of water while rejecting the oil. As previously described, the alumina support has pores having the largest dimension of 0.2 to 3 μm. When the PPy layer is dispersed over the support, the membrane maintains porosity with pores that are smaller in size, due to the PPy particles filling and covering a portion of the pores. The membrane of the present disclosure is porous, having pores with the largest dimension of 0.1 to 2 μm, preferably 0.5 to 1.5 μm, or approximately 1 μm. In some embodiments, the membrane has a porosity of 30-40% meaning that 30-40% of the membrane surface is a void or channel which allows passage of the water. In some embodiments, the membrane has a porosity of 30-40%, preferably 32-38%, or 34-36%.

Another factor that affects the performance of the membrane is the thickness of the active layer. The permeation flux can be affected (reduced) by increasing the thickness of the active layer. Hence it is desirable to have a thin active layer. In some embodiments, the thickness of the active layer (polypyrrole layer) is in a range of 100-500 nm, preferably less than 300 nanometers. However, the thickness of the active layer can be adjusted by regulating the synthetic method which is described below.

A method for making the membrane is described. Referring to FIG. 1, a schematic flow diagram of a method of making the membrane is illustrated. The order in which the method 50 is described is not intended to be construed as a limitation, and any number of the described method steps may be combined in any order to implement the method 50. Additionally, individual steps may be removed or skipped from the method 50 without departing from the spirit and scope of the present disclosure. As would be apparent to one of ordinary skill in the art, the steps could be modified to include another support, or monomer of a desired polymer.

At step 52, the method 50 includes mixing an aqueous solution of sodium dodecyl sulfate (SDS) and the alumina support to form a mixture. To activate the alumina support and enhance the wettability of the membrane, the alumina support was immersed/dipped/soaked in an aqueous solution of sodium dodecyl sulfate (SDS) to yield a first mixture. In some embodiments, the concentration of the SDS in the aqueous solution is in a range of 0.05-30 wt. %, preferably 0.5-10 wt. % of the total weight of the aqueous solution. The immersion of the alumina support into the aqueous solution can be carried out at room temperature—preferably at a temperature range of 20-37° C. SDS is used as a wetting agent or a surfactant to enhance the wettability without altering the inherent characteristics of the alumina support. In some embodiments, other surfactants that can improve the wettability of the alumina support may also be used—for example: sodium dodecyl benzenesulfonate (SDBS), cetyltrimethylammonium bromide (CTAB), and sodium lauryl sulfate (SLS).

At step 54, the method 50 includes mixing pyrrole in the mixture to form a second mixture. The pyrrole may be added to the second mixture as a neat pyrrole or by mixing the pyrrole in a suitable solvent—for example: methanol. For example, pyrrole is introduced to the mixture as a liquid. The pyrrole concentration may be in the range of 0.01 to 2 M. The reaction is conducted by adding a pre-defined amount of pyrrole dropwise to form the second mixture. In this step, the PPy adsorbs to the surface of the alumina before it is polymerized.

At step 56, the method 50 includes adding a polymerization agent to the second mixture to form the membrane. In an embodiment, the polymerizing agent is an oxidizing agent. The oxidizing agent is intended to denote any oxidizing substance capable of oxidizing pyrrole or a substituted derivative to produce polypyrrole. Pyrrole is a H-bond donor; therefore, it can develop sufficient H-bonding with oxygen atoms of alumina, leading to the deposition of a stable PPy active layer on the alumina support. Examples of strong oxidants include the cations $Fe^{3+}$, $Cu^{2+}$, and $Ce^{4+}$. In an embodiment, the polymerization agent is $FeCl_3$. The polymerization of the pyrrole monomer on the alumina support was adjusted by regulating the concentration of the polymerization agent, temperature, and the polymerization period. The prepared membrane may be washed with oil/alcohol, such as methanol or a combination thereof, for further applications.

The membrane of the present disclosure has a water contact angle of less than 5°, preferably less than 4°, less than 2°, or approximately 0° in air. This indicates that the membrane is superhydrophilic in air. The membrane of the present disclosure has an oil contact angle of less than 5°, preferably less than 4°, less than 2°, or approximately 0° in air. This indicates that the membrane is superoleophilic in air. The membrane of the present disclosure has an underwater contact angle of greater than 150°. The membrane of the present disclosure has an underwater contact angle of 1550 to 165°, preferably 1570 to 163°, or 1590 to 161°. This indicates that the membrane is superoleophobic underwater. These 3 properties combined are a result of the synergistic relationship between the alumina and PPy in the membrane. Such a surface is beneficial for O/W separation as it will not allow the oil to wet the membrane surface. The superhydrophilicity allows the water to come in contact with the membrane surface which develops a strong hydration layer on the membrane surface. While not wishing to be bound to a single theory, it is believed that the establishment of hydration layer is attributed to the presence of PPy layer on alumina support as the PPy has the ability to develop hydrogen bonding with water molecules. Moreover, the presence of hydroxyl groups (—OH) from the alumina along the walls of the membrane channels lead to a further enhancement in the hydrophilicity of the membrane resulting into an easy passage of water while rejecting the oil.

In some embodiments, the membrane has a permeate flux of at least 1,000 liters per meter square per hour ($L\ m^{-2}h^{-1}$) at a pressure of 2 bar, preferably 1,000 to 2,000 $L\ m^{-2}h^{-1}$, 1,200 to 1,800 $L\ m^{-2}h^{-1}$, 1,400 to 1,600 $L\ m^{-2}h^{-1}$. In some embodiments, the membrane has a separation efficiency of at least 95%, preferably at least 97% or at least 99%, at a pressure of 0.1 to 5 bar.

EXAMPLES

The following examples demonstrate the membrane, as described herein. The examples are provided solely for illustration and are not to be construed as limitations of the present disclosure, as many variations thereof are possible without departing from the spirit and scope of the present disclosure.

Example 1: Materials and Methods

Pyrrole monomer ($C_4H_5N$, 98%), ferric chloride ($FeCl_3$; 97%), Sodium dodecyl sulfate [$CH_3(CH_2)11OSO_3Na$; ≥98.5%], and methanol ($CH_3OH$; ≥99.8%) were acquired from Sigma (USA) and used as received. Alumina ($Al_2O_3$) ceramic supports were purchased from New Material Co., LTD, China.

Example 2: Fabrication of PPy Decorated Alumina Ceramic Membrane

Figure 2:
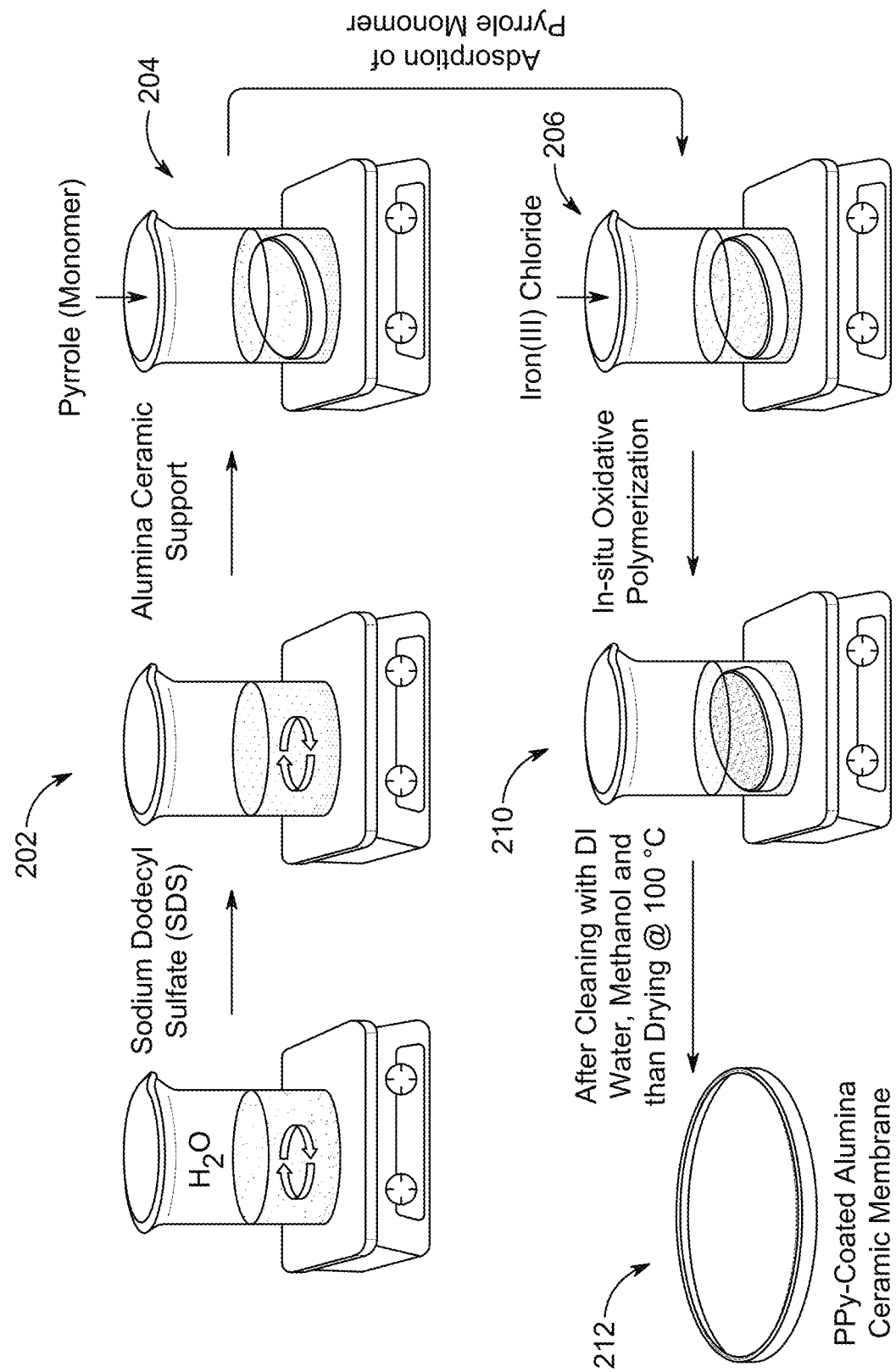
FIG. 2 is a diagrammatic scheme for fabrication of a polypyrrole (PPy)-coated alumina ceramic membrane, according to certain embodiments.

The ultrafiltration PPy decorated ceramic-polymeric membrane was fabricated by adopting an approach depicted in FIG. 2 (200). In the procedure, to enhance the wettability of alumina support, it was dipped in water, followed by its immersion in an aqueous solution of sodium dodecyl sulfate (SDS) (202). Following alumina support immersion and wettability, alumina support was dipped in an aqueous solution of pyrrole (Py) monomer (204). Following the adsorption of Py by alumina support, a catalytic amount of $FeCl_3$ was added to the solution (206), which led to the oxidative polymerization of Py and the establishment of a PPy active layer on alumina support (208). Following oxidative polymerization in the presence of $FeCl_3$ (210), the PPy-decorated ceramic-polymeric ultrafiltration membrane was thoroughly washed with DI water and methanol (212).

Figure 3A:
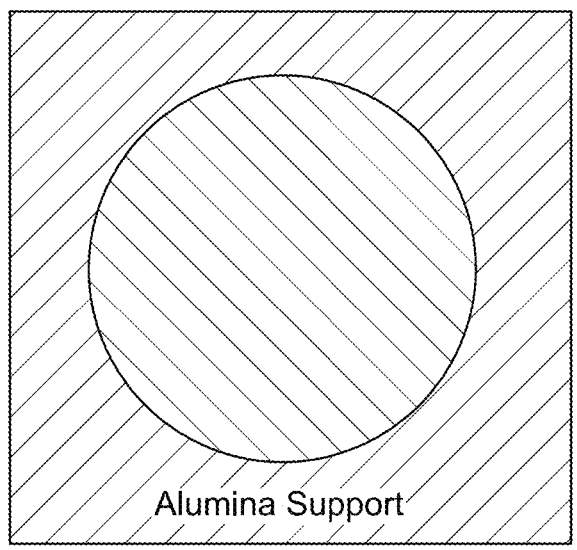
FIG. 3A is a digital photograph of an alumina support, according to certain embodiments.
Figure 3B:
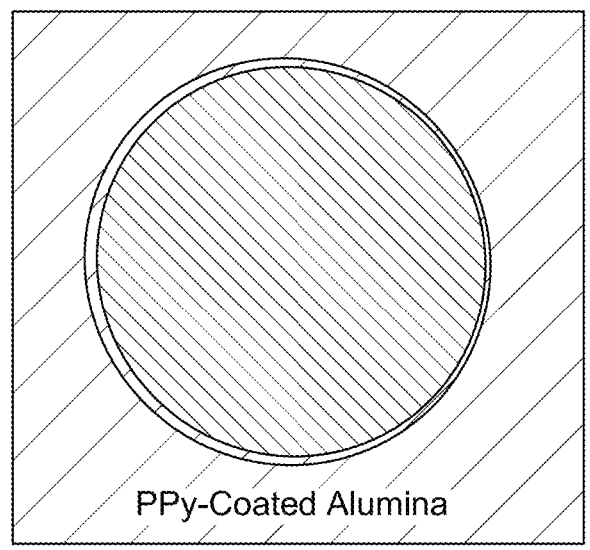
FIG. 3B is a digital photograph of the PPy-coated alumina, according to certain embodiments.

The PPy was uniformly coated on the entire membrane area, as shown in the digital images in FIG. 3A and FIG. 3B. The resultant PPy decorated ceramic-polymeric ultrafiltration membrane was subjected to separating O/W surfactant stabilized oily wastewater streams.

Example 3: Characterization Techniques of PPy Decorated Alumina Membrane

Attenuated Total Reflectance Fourier Transform Infrared (ATR-FTIR) spectroscopy (Nicolet iS50 FTIR; Thermo Fisher Scientific, located at 168 Third Avenue, Waltham, MA USA 02451) was performed to identify the functional groups in the membrane by exposing a dried piece of ceramic membrane to a laser beam, and a scan was run from 400 cm$^{-1}$ to 4000 cm$^{-1}$. Powder X-ray Diffraction (PXRD) was conducted to identify various crystallographic features of the ceramic membranes. An appropriate ceramic membrane sample was exposed to an X-ray source by fixing it on a rotating stage (MiniFlex benchtop XRD system; Rigaku). The scan was run from θ=5° to θ=90°. The surface features of the ceramic membrane were determined by measuring the water contact angle in air and underwater oil contact angle using a goniometer (KRUSS, DSA25). An appropriate piece of the ceramic membrane was taken for contact angle measurements. The surface morphological features of the ceramic membranes were identified by scanning electron microscope (SEM) analysis of the ceramic membranes using SEM (JEOL, JSM-6610). Appropriate pieces of the dried membranes were coated with gold coating using a thin film coater for 30 seconds.

Example 4: Filtration Experiments Using Different Oily Wastewater Feeds

The filtration experiments were conducted using various feeds, including DI water, diesel oil emulsion, motor oil emulsion, and crude oil emulsion. Different concentrations of the O/W emulsions were evaluated during filtration experiments using a dead-end filtration setup (Sterlitech, 4620, B Street NW Suite 101 Auburn, WA 98001 USA). The permeate flux and oil/water separation efficiency for various surfactant stabilized oil-in-water emulsions (diesel oil-in-water, motor oil-in-water, and crude oil-in-water) were calculated using the following equations:

$$\text{Permeate flux rate } (J) = \frac{V}{A \times t} (Lm^{-2}h^{-1})$$

$$\text{Separation efficiency } (\eta) = 1 - \left[\frac{C_p}{C_0}\right] \times 100(\%)$$

Here, J represents the volume of permeate water through a unit area in unit time. So, V denotes the total volume permeated, A (m$^2$) and t (h) is the area of the membrane and time, respectively. Similarly, η is the percentage efficiency resulting from Cp (Concentration of the oil in permeate) and C$_0$ (concentration of oil in the feed).

Example 5: Characterization and Performance of the PPy Decorated Alumina Membrane The PPy active layer was deposited on alumina support to develop strong H-bonding between PPy and alumina support. As PPy is a well-known H-bond donor, it can develop H-bonding with oxygen atoms of alumina, leading to the deposition of a stable PPy active layer on the alumina support as depicted in FIG. 4. The current strategy of depositing PPy on alumina is advantageous in not only depositing a stable PPy coating on alumina, but it also plays a role in developing H-bonding with water molecules during filtration experiments leading to the super-hydrophilic membrane as confirmed by water contact angle (WCA).

Figures 5A, 5B:
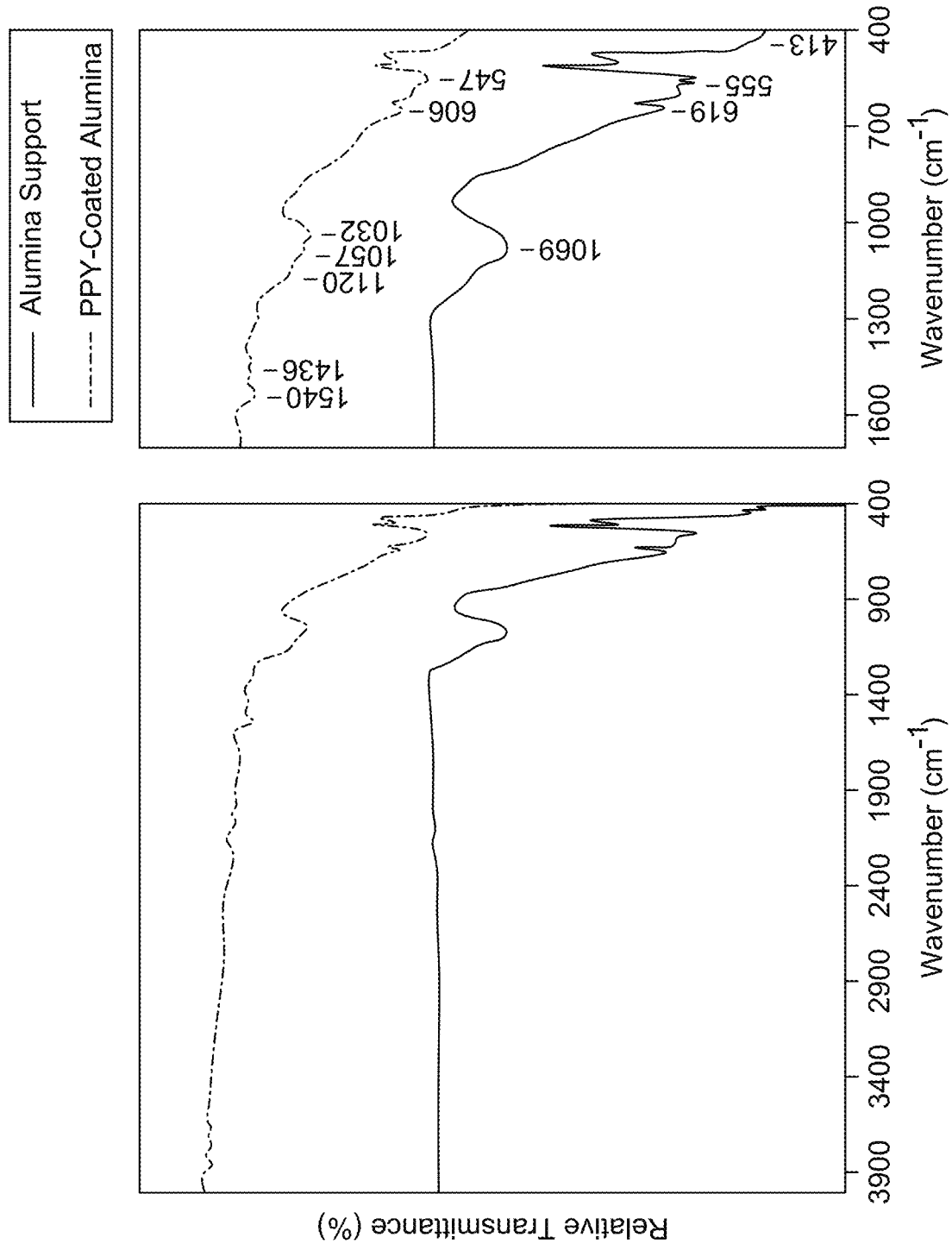
FIG. 5A and FIG. 5B depict Attenuated total reflectance Fourier transform infrared spectroscopy (ATR-FTIR) spectra of alumina support, and PPy-coated alumina membrane, according to certain embodiments.
Figure 5C:
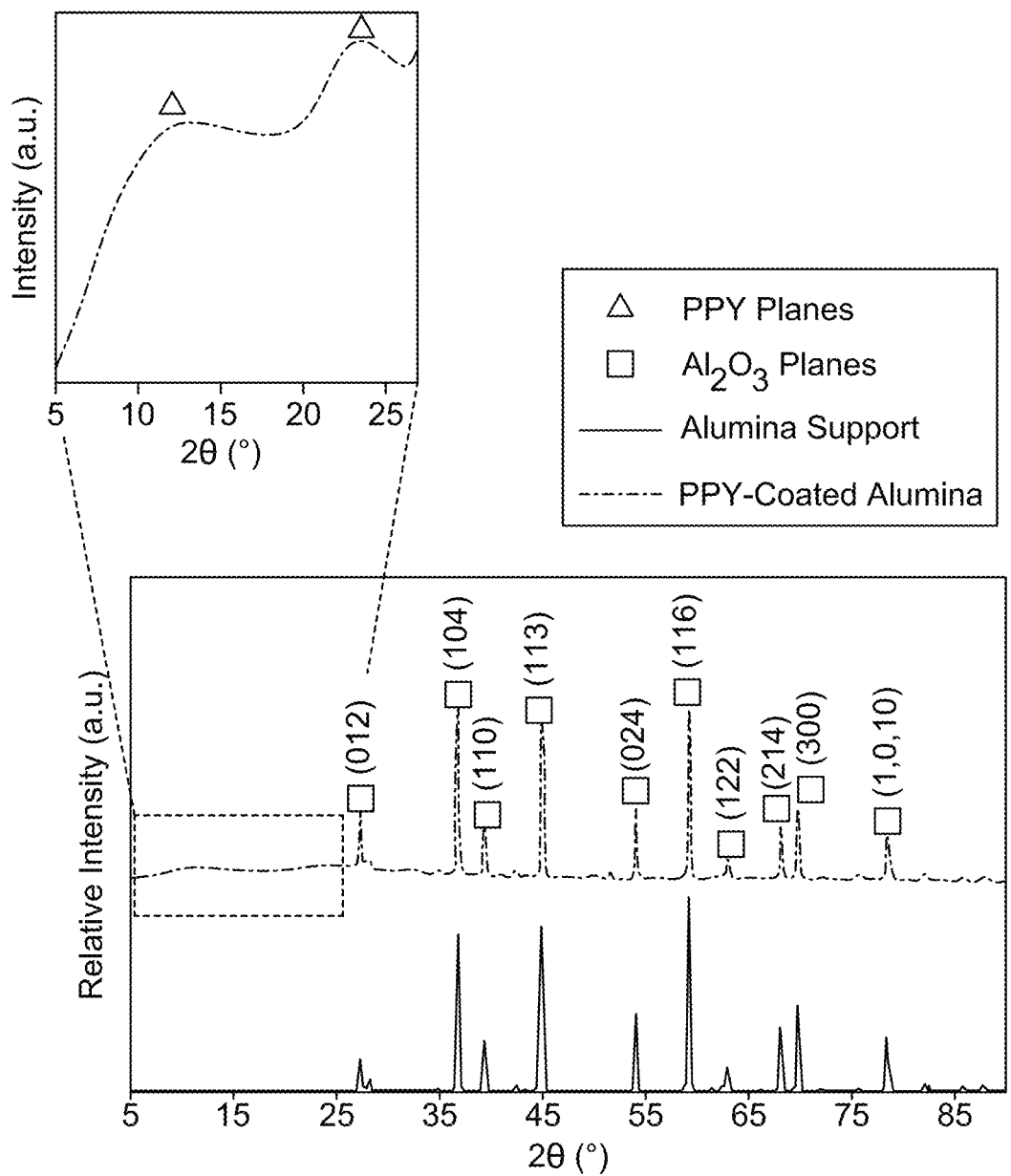
FIG. 5C depicts a powder X-ray diffraction (PXRD) pattern of the alumina support, and the PPy-coated alumina membrane, according to certain embodiments.

The identification of various functional groups was carried out by ATR-FTIR, as shown in FIG. 5A and FIG. 5B. The FTIR of alumina support showed a peak at 1069 cm$^{-1}$, which is due to the Al—O bond of alumina (FIG. 5B). Moreover, the presence of a valley between 1000 cm$^{-1}$ and 500 cm$^{-1}$ is the γ-form of alumina. The characteristics peaks of PPy were identified at 1540 cm$^{-1}$, 1436 cm$^{-1}$, 1120 cm$^{-1}$, and 1032 cm$^{-1}$, which were attributed to pyrrole ring vibration, =CH in plane vibration, C—N stretching, and N—H in plane absorption of pyrrole ring (FIG. 5B). Another evidence for forming a PPy active layer on the alumina support was gathered by measuring the PXRD pattern of the alumina support and PPy alumina membrane (FIG. 5C). PXRD pattern of alumina support was recorded and compared with literature. The PXRD pattern of the membrane showed the presence of all of the peaks of alumina. However, in addition to the peaks of alumina, the characteristic broad peaks of PPy were found at 2θ=11.5° and 25.0°, which confirmed the formation of an amorphous polymeric network of PPy.

Figure 6A:
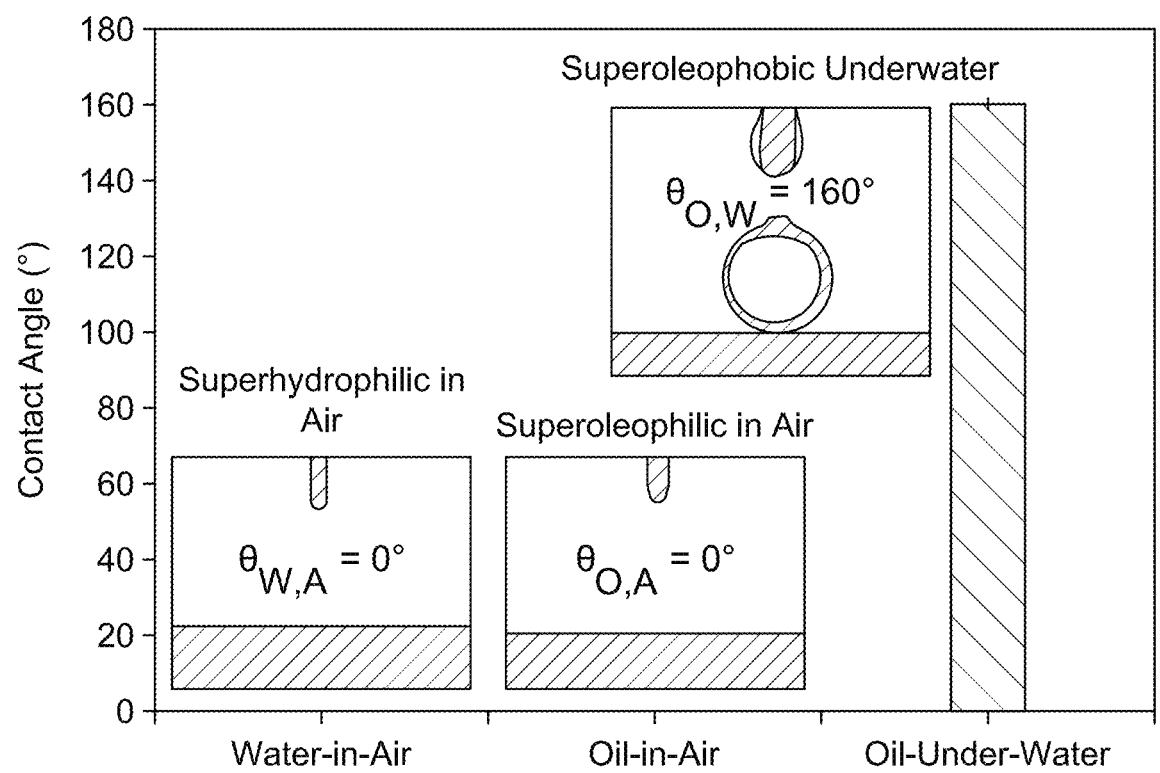
FIG. 6A is an image depicting an in-air water contact angle, in-air oil contact angle, and underwater oil contact angle of the PPy-coated alumina membrane, according to certain embodiments.
Figure 6B:
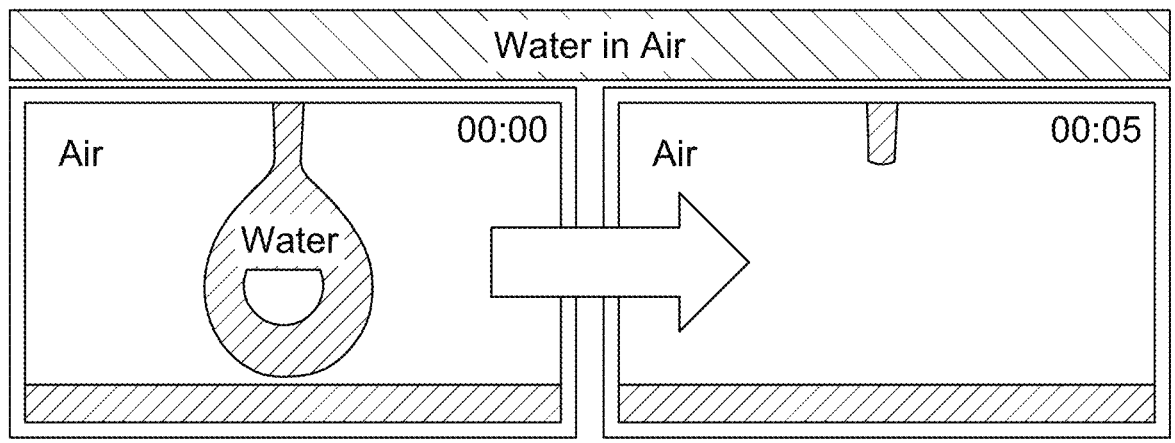
FIG. 6B and FIG. 6C depict events of measurements of in-air water contact angle and underwater contact angle captured from video of contact angle measurements, according to certain embodiments.
Figure 6C:
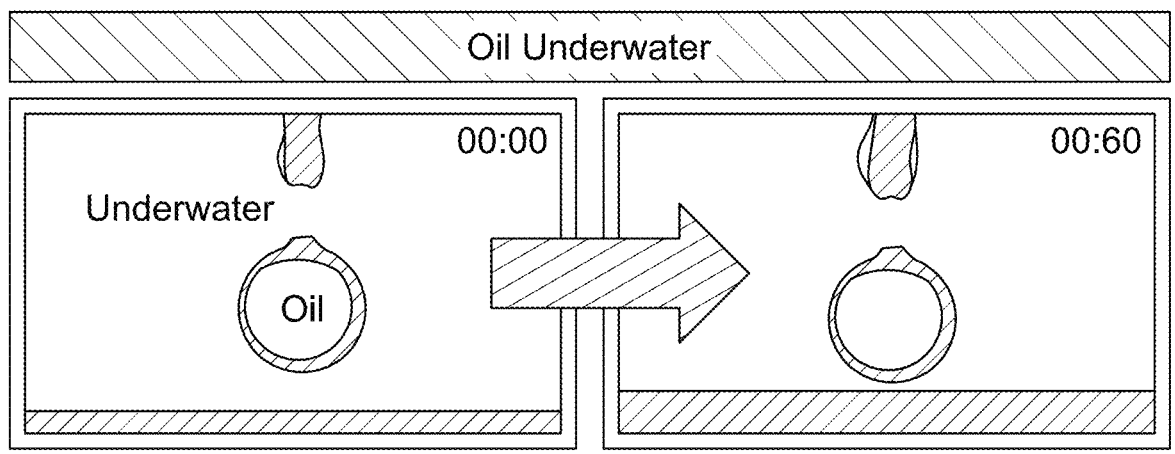
Figure 7A:
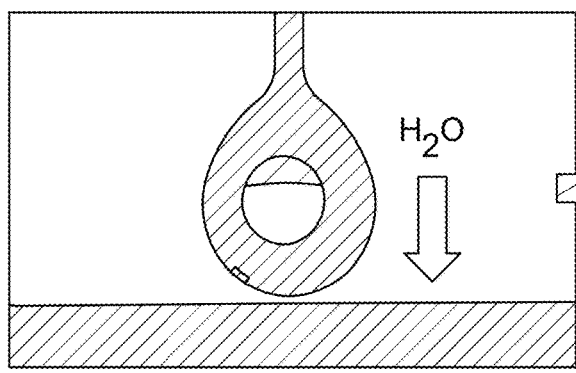
FIG. 7A depicts contact angle analysis of the alumina support with time, where a water droplet is approaching the alumina support, according to certain embodiments.
Figure 7B:
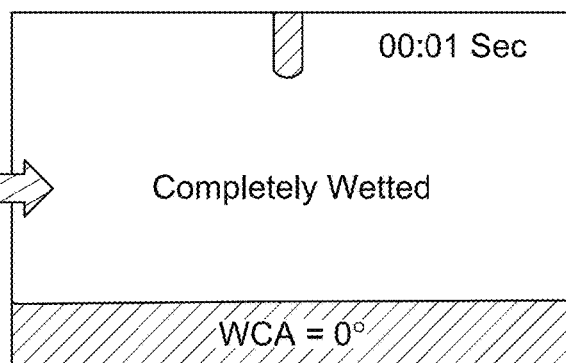
FIG. 7B depicts the contact angle analysis of the alumina support with time, where a water droplet is completely wetted within 1 sec on alumina support (super-hydrophilic; WCA=00), according to certain embodiments.
Figure 8A:
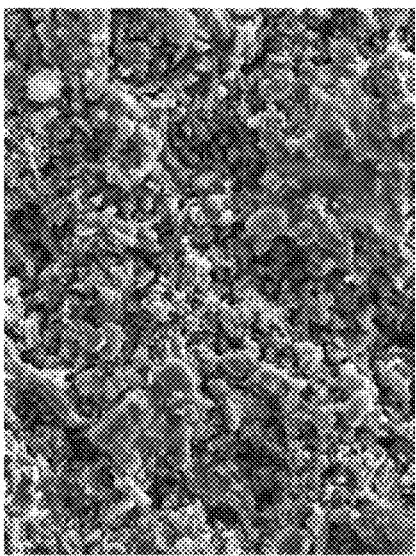
FIG. 8A-FIG. 8C show scanning electron microscope (SEM) micrographs of the alumina support, at different magnifications, according to certain embodiments.
Figure 8B:
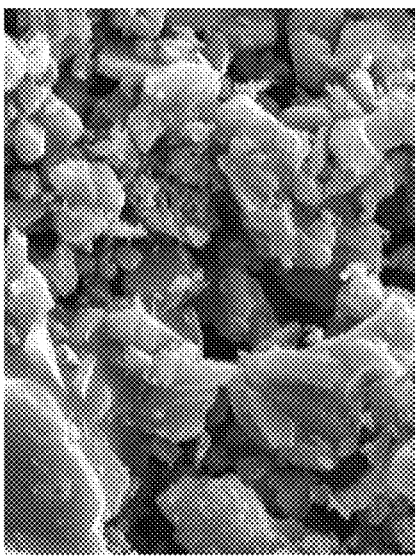
Figure 8C:
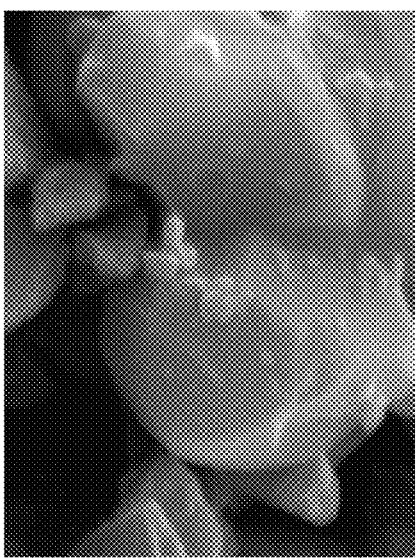
Figure 8D:
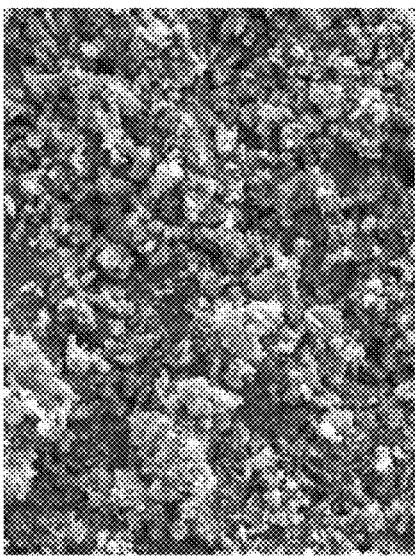
FIG. 8D-FIG. 8F show SEM micrographs of the PPy-coated alumina membrane, at different magnifications, according to certain embodiments.
Figure 8E:
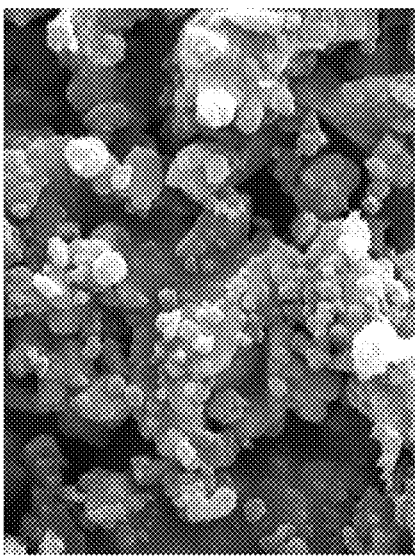
Figure 8F:
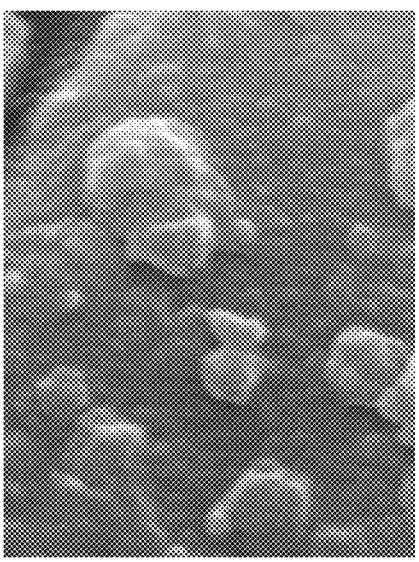

To understand the surface hydrophilicity of the fabricated membrane, both water and oil contact angles in the air were measured. The in-air water and oil contact angles of the PPy-coated alumina membrane revealed that the membrane was super-hydrophilic as well as super-oleophilic in the air because both the water contact angle (WCA; $\theta_{W,A}$) and oil contact angle (OCA; $\theta_{O,A}$) were found to $\theta_{W,A}=0°$ and $\theta_{O,A}=0°$ (FIG. 6A). However, an oleophobicity as the underwater OCA was recorded as $\theta_{O,w}=160°$. Various events of measuring in air $\theta_{W,A}$ (FIG. 6B) and underwater θO,w (FIG. 6C) were recorded where it is evident that the water droplet disappeared in just 5 s while the oil droplet did not wet the PPy-coated alumina membrane for even 60 s. These observations indicated that the membrane was super-hydrophilic in air and superoleophobic under water. These features are helpful for oil-in-water emulsion separation because such a membrane surface would preferably allow water to permeate through while rejecting oil. Being an amine PPy can develop interactions such as H-bonding with water molecules. The in-air WCA of bare alumina support was also measured, and it was found that the alumina support was completely wetted in mere 1 s (FIG. 7A and FIG. 7B).

Following the determination of surface hydrophilicity of the PPy-coated alumina membrane, the morphology of the alumina support and PPy-coated alumina membrane was also studied by using SEM micrographs (FIG. 8). Since alumina is a ceramic support, the presence of differently sized alumina particles can be seen in the ceramic membrane support. Moreover, the presence of numerous large-sized pores can also be seen in the alumina support (FIG. 8A-8C). Similar morphology was also seen for PPy-coated alumina ceramic membrane at lower magnification (FIG. 8D). However, as the magnification increases, the evidence of PPy growth can be readily observed (FIG. 8E) in the form of globules which are due to the polymerization of pyrrole monomers. An observation can be seen in FIG. 8F, where it can be seen that alumina particles are considerably covered by the polymeric mass of PPy. A PPy polymeric network can be responsible for oil rejection from oil/water emulsion. The bulk porosity (F) of the alumina support and PPy-coated alumina membrane was also calculated by measuring the weight of dry and wet membranes (Ahmad T., et al., 2020. Enhanced performance of salt-induced Pluronic F127 and bentonite blended polyvinyl chloride ultrafiltration membrane for processing oilfield-produced water. J. Water Proc. Eng. 34, 101144—incorporated herein by reference) as shown below in Eq. (1).

$$\varepsilon(\%) = \frac{W_{wet} - W_{dy}}{V \rho_w} \times 100, \quad (1)$$

where $W_{wet}$ and $W_{dry}$ are the wet and dry weights of the membranes (Kg), V is the volume of the membrane (m³) and ρw is the density of water in Kg/m³. It was found that the porosity of the membrane was reduced in the case of a PPy-coated alumina membrane (35.18%) compared to bare alumina support (50.704%). This leads to enhanced separation performance of PPy coated alumina membrane compared to bare alumina support.

Figure 9A:
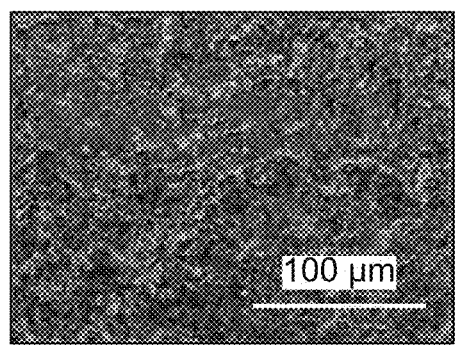
FIG. 9A shows SEM micrographs of the alumina support, according to certain embodiments.
Figure 9B:
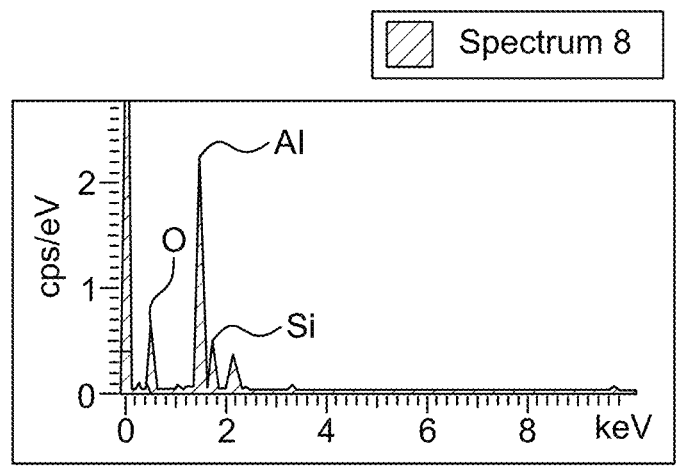
FIG. 9B shows energy dispersive X-ray spectroscopy (EDX) analysis of the alumina support, according to certain embodiments.
Figure 9C:
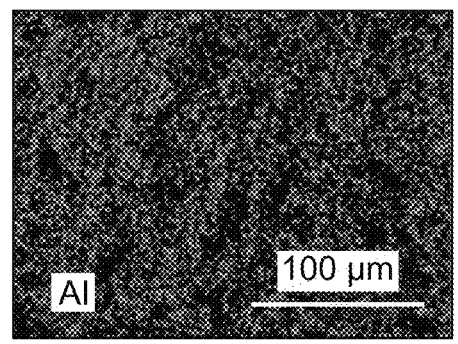
FIG. 9C and FIG. 9D show the elemental mapping of the alumina support, according to certain embodiments.
Figure 9D:
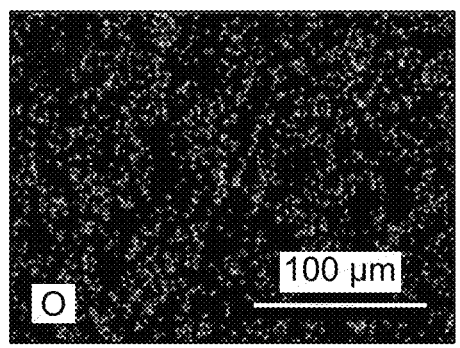
Figure 9E:
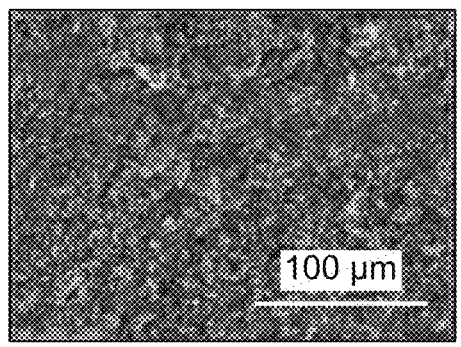
FIG. 9E shows SEM micrographs of the PPy-coated alumina membrane, according to certain embodiments.
Figure 9F:
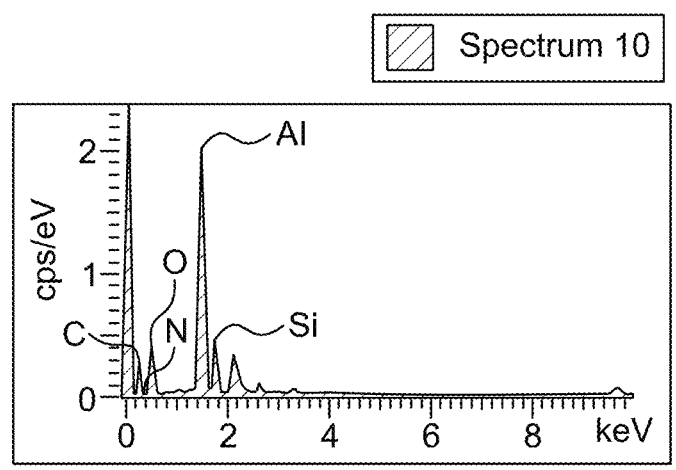
FIG. 9F shows EDX analysis of the PPy-coated alumina membrane, according to certain embodiments.
Figure 9G:
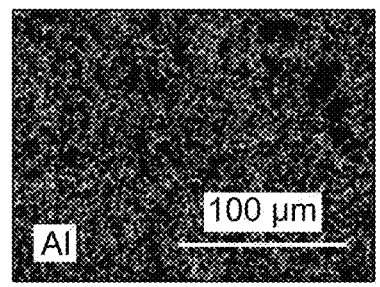
FIG. 9G-9J show the elemental mapping of the PPy-coated alumina membrane, according to certain embodiments.
Figure 9H:
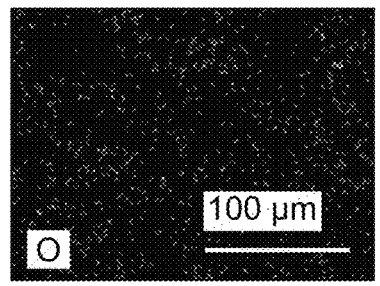
Figure 9I:
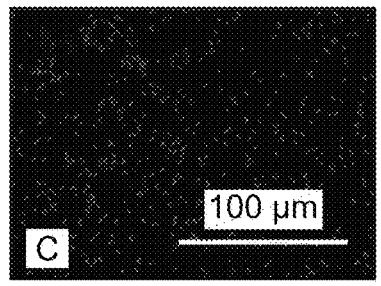
Figure 9J:
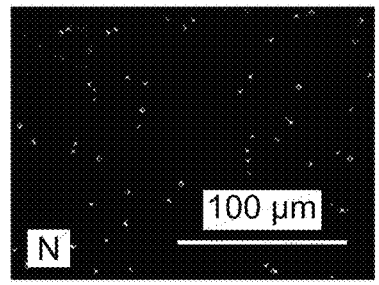

To further understand the composition of the fabricated membrane, the elemental composition and distribution of elements of the membrane were studied by EDX analysis and elemental mapping. FIG. 9A shows SEM micrographs of alumina support. The EDX analysis of the alumina support (FIG. 9B) revealed the presence of the constituent elements, such as Al (aluminum) (FIG. 9C) and O (oxygen) (FIG. 9D), along with a certain quantity of Si (silicon). FIG. 9E SEM micrograph of PPy coated alumina membrane. The EDX analysis of the PPy-coated alumina membrane is depicted in FIG. 9F. Upon coating the alumina support with PPy, the EDX analysis detected certain additional elements such as C (carbon) and N (nitrogen). The presence of N and C confirmed the formation of a PPy active layer on an alumina support. The elemental mapping results demonstrated that the elements, namely C (FIG. 9I), N (FIG. 9J), Al (FIG. 9G), and O (FIG. 9H), were equally distributed over the entire area of the alumina support and PPy coated alumina ceramic membrane. Another important finding was the intensity of the distributed particles, which is directly related to the concentration of the relevant element in the membrane. The concentration of Al, O, and C was considerably higher, which can be attributed to the presence of considerable amounts of these elements in the ceramic alumina, and PPy coated alumina. The Alumina (Al₂O₃) is composed of Al and O, while PPy coated alumina has a higher concentration of C than N. In the case of the pyrrole monomer, the ratio between C and N is 4:1, which was also reflected in a comparatively lower intensity of N in elemental mapping. A considerably high concentration of Al and O, even after being coated with PPy (FIG. 9G and FIG. 9H), hinted at forming a very thin active layer of PPy over alumina support. The establishment of a thin active layer is a desirable feature for a membrane performance.

Figure 11:
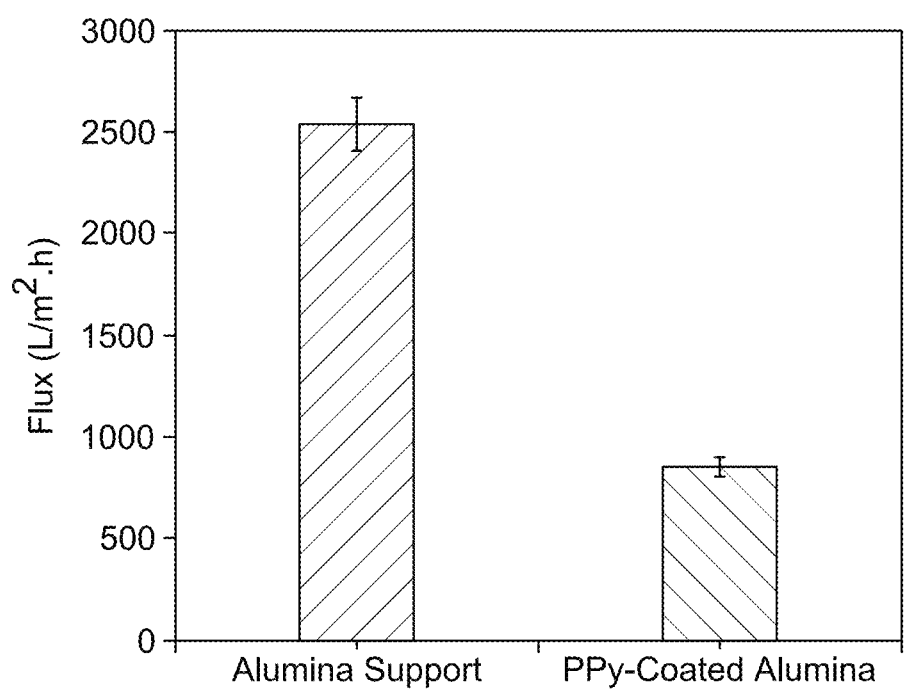
FIG. 11 is a plot depicting permeate water flux of the alumina support and the PPy-coated alumina ceramic membrane using a feed of 125 ppm at 1 bar transmembrane pressure, according to certain embodiments.

Following the thorough characterization and establishment of the structure of PPy coated alumina ceramic membrane, the oil/water separation performance of the ceramic membrane was evaluated by using 125 ppm O/W emulsion of diesel in water. The effect of transmembrane pressure was evaluated, as shown in FIG. 10A. The permeate water flux (LMH; L m⁻²h⁻¹) was increased with increasing transmembrane pressure. The flux reached 380 LMH to 2112 LMH as the pressure increased from 0.5 bar to 2 bar (FIG. 10A). This higher flux of the membrane can be attributed to the lower WCA of PPy-coated alumina ceramic membrane as in air WCA was found to be 0° (FIG. 6A). Moreover, the thin PPy layer also offers lower transport resistance during the passage of water through the ceramic membrane. On the other hand, the separation efficiency of PPy coated membrane stayed above 99% at all of the studied transmembrane pressures (FIG. 10B). The PPy coating showed higher separation efficiency, which can be attributed to the underwater superoleophobic nature of the PPy-coated alumina ceramic membrane as underwater OCA was ≥160 (FIG. 6A). The superoleophobic nature of the membrane leads to rejection of the oil while allowing the water to pass through the membrane. Furthermore, the membrane showed consistent performance under all the applied transmembrane pressures, which showed that the PPy active layer was highly selective for separating oil from water. A performance comparison with bare alumina membrane (support) was done, and the results indicate that the alumina support showed a higher flux (2535.2 LMH) compared to PPy coated alumina support with a flux of 845.1 LMH at 1 bar using an emulsion of 125 ppm (FIG. 11).

Figure 12B:
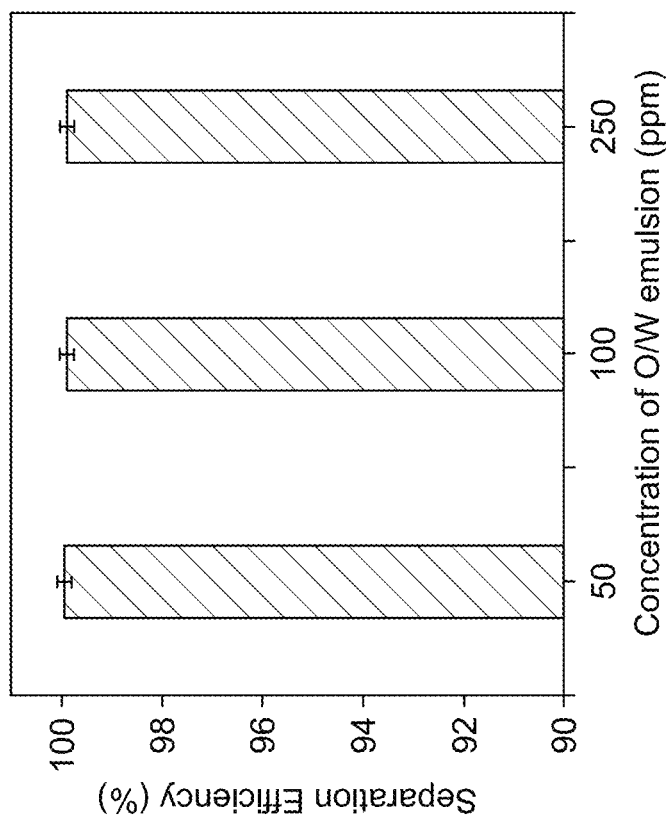
FIG. 12B shows a separation efficiency of the PPy-coated alumina ceramic membrane at different concentrations of diesel oil-in-water emulsion at 1 bar transmembrane pressure, according to certain embodiments.
Figure 12A:
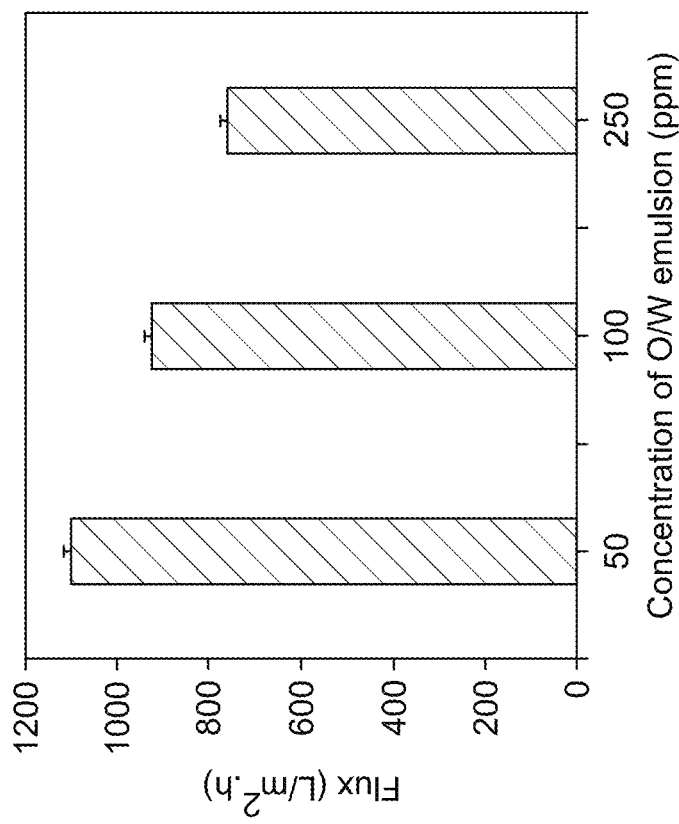
FIG. 12A shows an effect of increasing concentration of oil in water on permeate water flux of the PPy-coated alumina ceramic membrane, according to certain embodiments.

To further understand the behavior of PPy coated alumina ceramic membrane, a study to determine the impact of increasing oil concentration on the performance of the membrane where the concentration of O/W emulsion was varied from 50 ppm to 250 ppm while keeping the transmembrane pressure constant at 1 bar was studied. It was observed that permeate water flux was decreased with increasing oil concentration in O/W emulsion. The flux was decreased from 1098 LMH to 760 LMH as the oil concentration was increased from 50 ppm to 250 ppm (FIG. 12A). This decrease in pure water flux can be attributed to the fouling of the membrane at higher oil concentrations. The separation efficiency of the PPy coated ceramic alumina membrane remained considerably higher at >99% for all of the tested feed concentrations (FIG. 12B). However, the performance of the membrane was well defined at 125 ppm at 1 bar transmembrane pressure. Hence, further experiments were carried out at 125 ppm diesel oil in water emulsion at 1 bar.

Figure 13B:
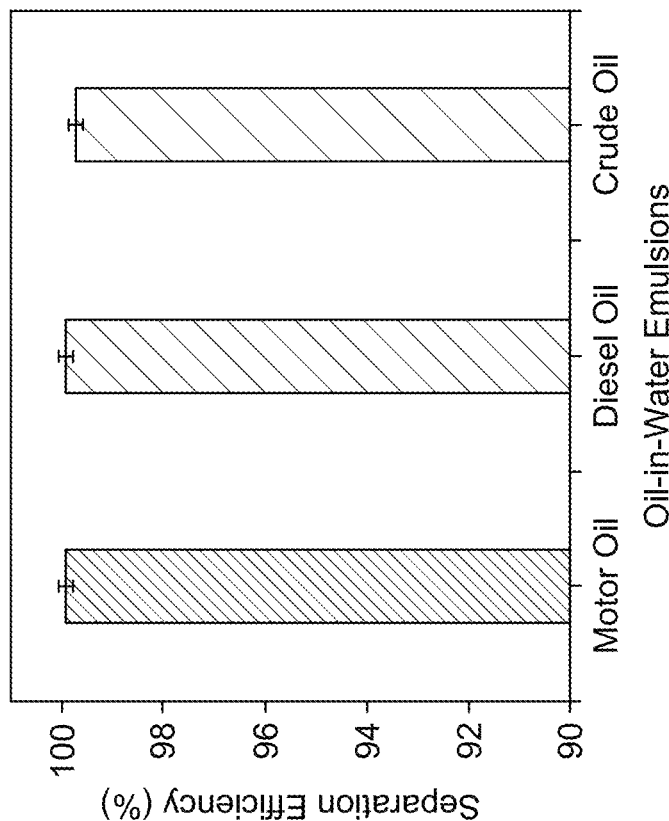
FIG. 13B shows a separation efficiency of the PPy-coated alumina ceramic membrane, for different feeds, at 1 bar transmembrane pressure using 125 ppm, according to certain embodiments.
Figure 13A:
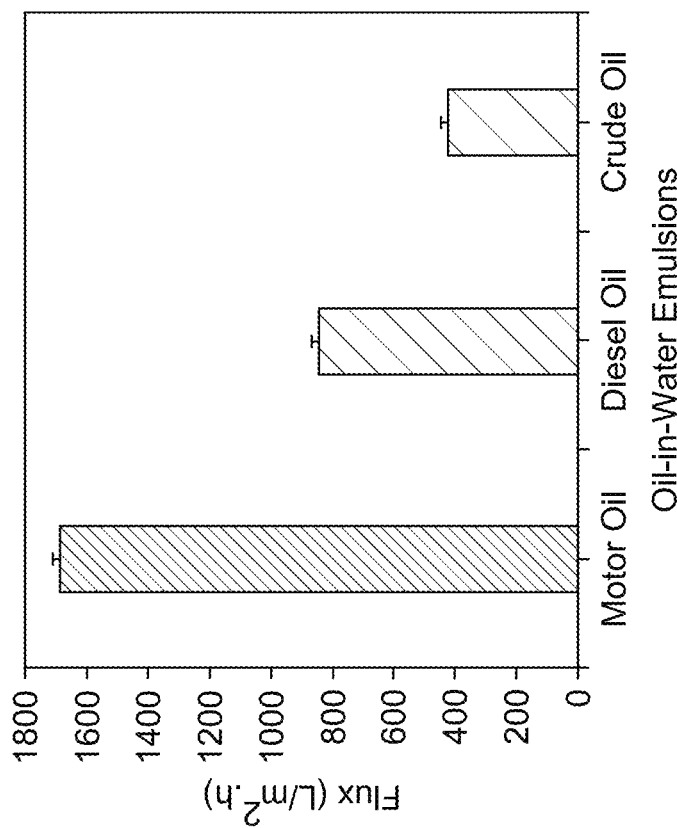
FIG. 13A shows an effect of feed type on permeate water flux of the PPy-coated alumina ceramic membrane, according to certain embodiments.

After studying the impact of increasing the concentration of oil in water emulsion, the nature of the feed was varied by using different types of oils (motor oil, diesel oil, and crude oil) to mimic the oily wastewater streams. The concentration of all emulsions was kept at 125 ppm. Different oils behaved differently with regard to the variation of flux at 1 bar. The permeate flux was found to be highest in case of motor oil with a value reaching to 1690 LMH. However, the diesel oil and crude oil showed a decrease in permeate flux where the permeate flux was found to be 845 LMH and 422 LMH, respectively (FIG. 13A). The decrease in permeate flux of the PPy-coated ceramic alumina membrane was attributed to the composition of different oils used during membrane filtration experiments. Motor oil is composed of aliphatic hydrocarbons, while diesel oil is composed of both aliphatic and polyaromatic hydrocarbons. The presence of polyaromatic hydrocarbons, in addition to aliphatic hydrocarbons, makes the oil foul the membrane surface. Crude oil is highly dense and has several types of hydrocarbons, which makes it develop even more fouling on the membrane. The presence of large-sized molecules leads to the blocking of the pores of the ceramic membrane, especially in the case of crude oil and diesel oil, leading to a decrease in permeate flux. However, such large-sized molecules are not found in motor oil and hence have relatively higher permeate flux than crude and diesel oil. The separation efficiency of the PPy-coated ceramic alumina membrane remained considerably higher >99% for all of the types of oils used in this study (FIG. 13B). There was a minute decrease in the separation efficiency of the crude oil feed, which might be due to the presence of smaller sized molecules which can find a passage through the ceramic membrane.

Figure 14:
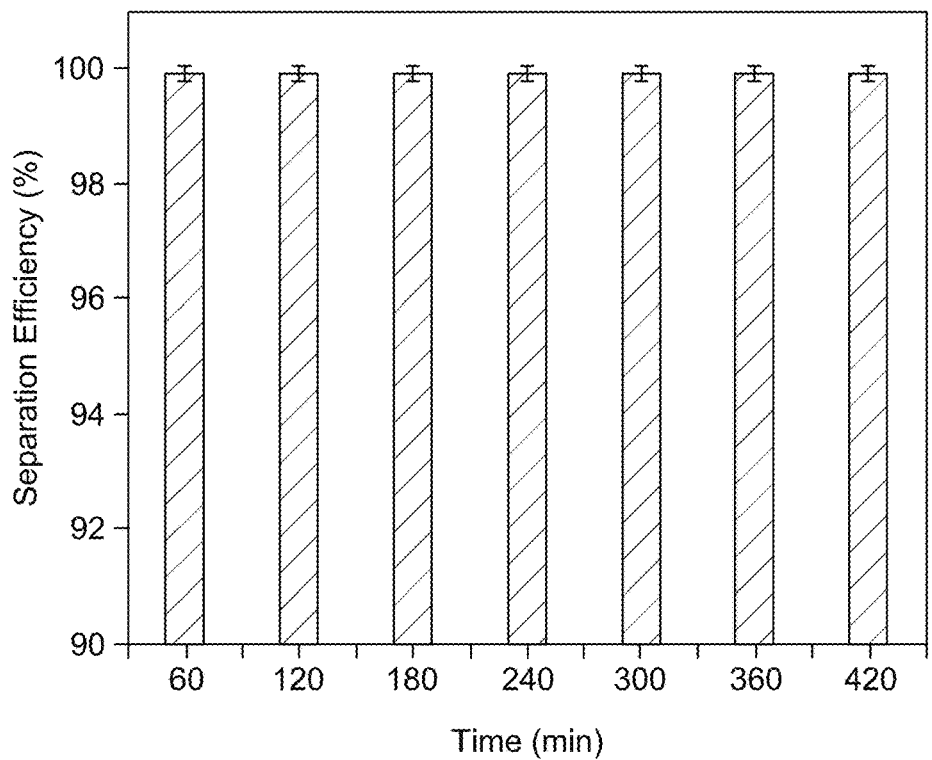
FIG. 14 shows a stability study of the separation efficiency of the PPy-coated alumina ceramic membrane for a feed of 125 ppm at 1 bar transmembrane pressure, according to certain embodiments.
Figure 15:
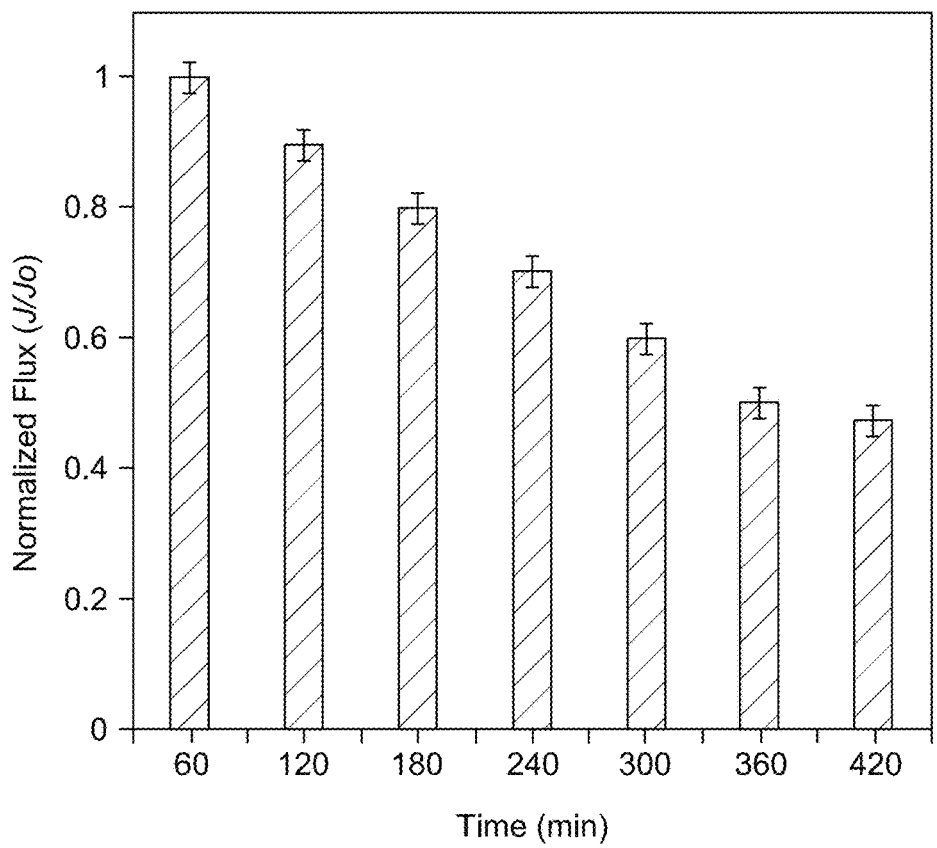
FIG. 15 is a plot depicting a permeate water flux (in terms of normalized flux) of the PPy-coated alumina ceramic membrane as a function of time, according to certain embodiments.

The stability performance of the PPy coated alumina membrane is given in FIG. 14. The stability was evaluated by measuring the O/W separation performance of the membranes as a function of time, where a feed of 125 ppm O/W surfactant stabilized emulsion was used for a period of 420 min. The PPy-coated membrane retained its performance at >99.9% for the tested period. However, the decline in flux was noted as given in FIG. 15, and this decline in flux was noted mainly due to the dead-end mode of filtration because during the permeation experiment, only water is allowed to pass while feed keeps on getting concentrated as retentate is not able to escape the filtration cell. In contrast, the cross-filtration has a lesser tendency to foul the membrane because the feed is continuously replenished during filtration experiments.

Figure 16A:
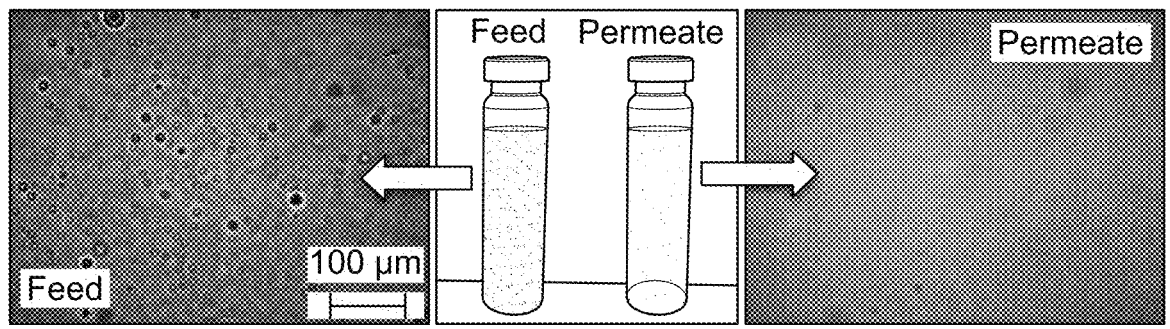
FIG. 16A shows light microscopic images of feed and relevant permeate for diesel oil, according to certain embodiments.
Figure 16B:
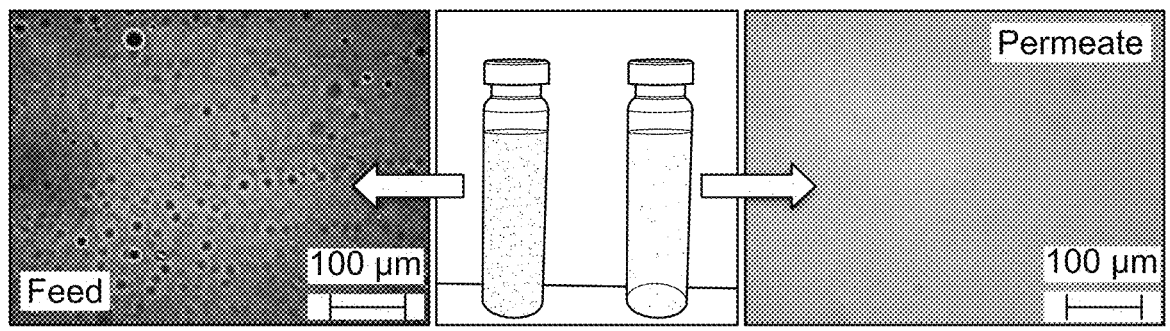
FIG. 16B shows light microscopic images of feed and relevant permeate for diesel oil, according to certain embodiments.
Figure 16C:
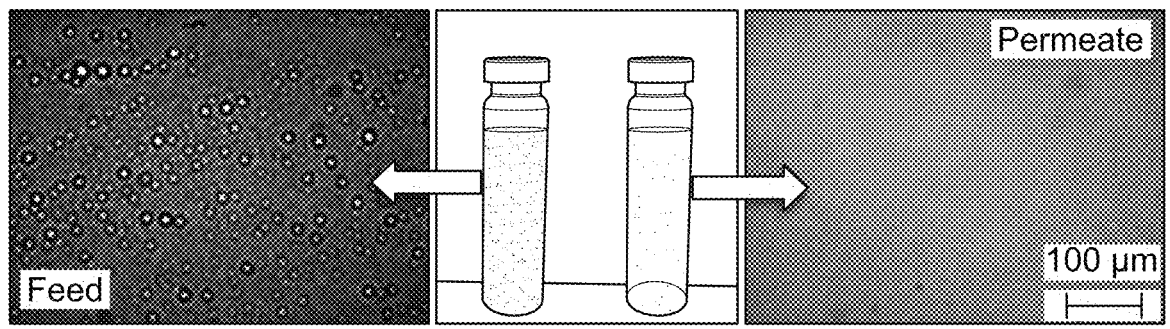
FIG. 16C shows light microscopic images of feed and relevant permeate for diesel oil, according to certain embodiments.

Light microscopy of the feeds (125 ppm of diesel, motor, and crude oil) and permeate was carried out. The light microscopy images of different tested feeds and their permeate, namely, diesel oil-in-water (FIG. 16A), motor oil-in-water (FIG. 16B), and crude oil-in-water (FIG. 16C), show the presence of a number of oil droplets dispersed throughout the feeds; while passing through the PPy-coated membrane, the permeate was clear of any oil droplets for all the three tested samples. A comparison of photographic images of experimental samples showed that feed solutions are cloudy while those of permeates are clear of any cloudiness. These observations agree with high separation efficiency (>99.9%).

Figure 17:
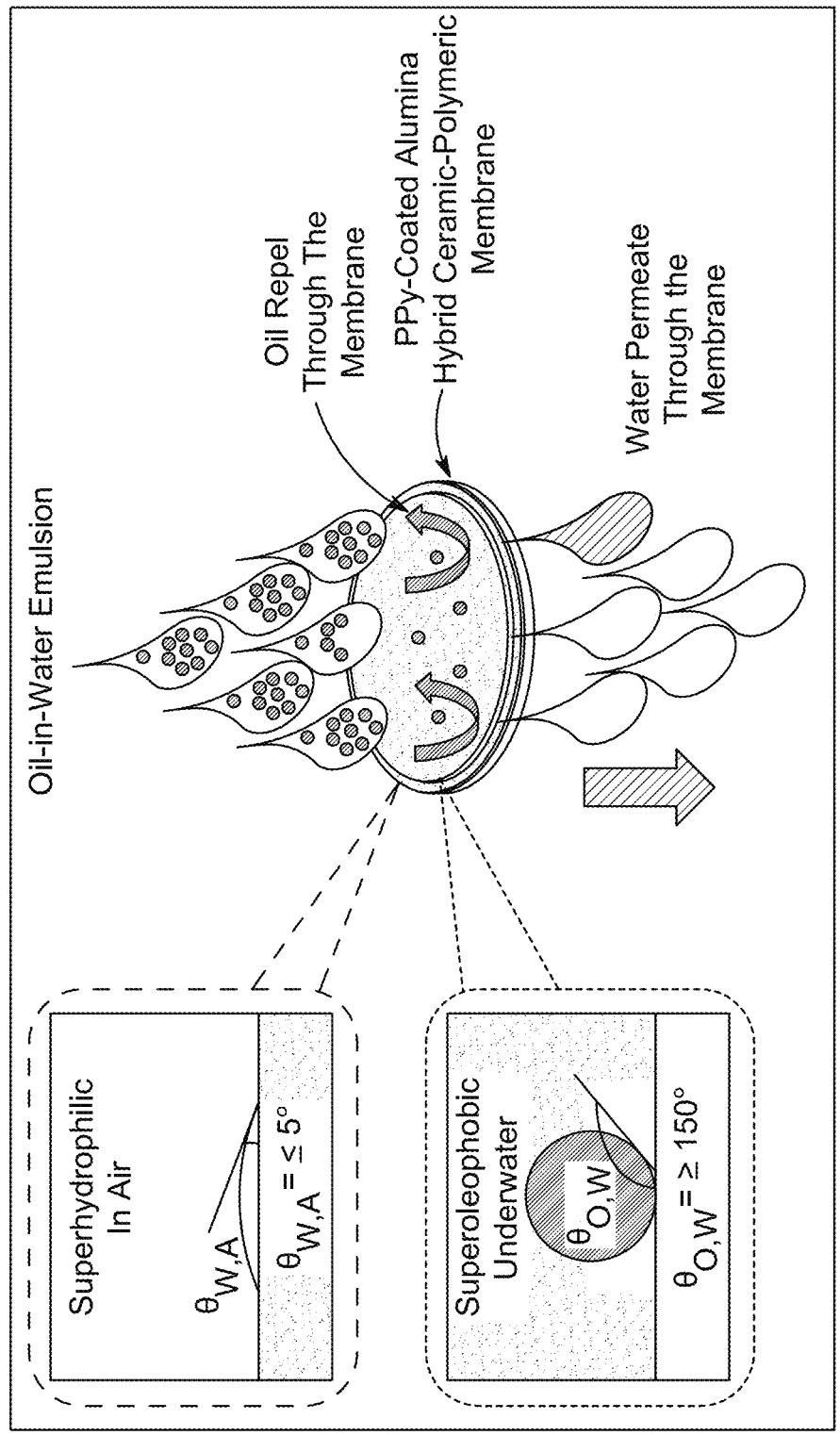
FIG. 17 is a schematic representation of an oil-in-water emulsion based on the super-hydrophilic, and underwater superoleophobic behavior of the PPy-coated alumina ceramic membrane, according to certain embodiments.

FIG. 17 illustrates a possible mechanism for separating oil from oil/water emulsion. Contact angle measurements found that PPy coated alumina membrane has special surface wettability as it has an underwater superhydrophilic surface. Such a surface is ideal for O/W separation as it will not allow the oil to wet the membrane surface. The superhydrophilicity allows the water to come in contact with the membrane surface, which develops a strong hydration layer on the membrane surface. The establishment of the hydration layer is attributed to the presence of the PPy layer on the alumina support, as the PPy can develop hydrogen bonding with water molecules. Moreover, the presence of hydroxyl group (—OH) along the walls of the membrane channels lead to a further enhancement in the hydrophilicity of the membrane resulting in an easy passage of water while rejecting the oil. These functional groups and features are also responsible for in air WCA to be ≤5° while underwater OCA being ≥150°.

Numerous modifications and variations of the present disclosure are possible in light of the above teachings. It is therefore to be understood that within the scope of the appended claims, the invention may be practiced otherwise than as specifically described herein.

The invention claimed is:
1. A method of separating an oil and water mixture, comprising:
    contacting the oil and water mixture with a membrane, wherein only the water in the oil and water mixture passes through the membrane,
    wherein the membrane, comprises:
        an alumina support; and
        a polypyrrole of formula (I);

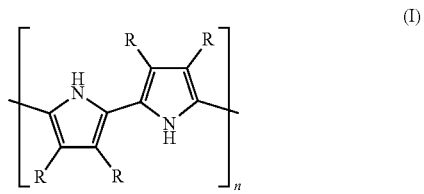

wherein in formula (I) R is selected from the group consisting of a hydrogen, an alcohol, a carboxylic acid, and a glycol having 2 to 5 carbon atoms,
wherein in formula (I) n is an integer from 1 to 500,
wherein a layer of the polypyrrole is hydrogen bonded to an outer layer of the alumina support,
wherein particles of the polypyrrole are present on the alumina support in the form of globules having a longest dimension of 100 to 300 nm.

2. The method of claim 1, wherein the layer of polypyrrole has a thickness of 100 to 500 nm.

3. The method of claim 1, wherein the particles of the polypyrrole are interconnected and form a continuous network along the surface of the alumina support.

4. The method of claim 3, wherein the network has regularly spaced protrusions from the surface of the alumina support, and
    wherein the protrusions are spaced 300 to 800 nm apart.

5. The method of claim 1, wherein the layer of polypyrrole is uniform on the alumina support.

6. The method of claim 1, wherein the polypyrrole has a weight average molecular weight of 5,000-100,000 g/mol.

7. The method of claim 1, wherein the membrane consists of the polypyrrole and the alumina support.

8. The method of claim 1, wherein the membrane comprises 10-20 wt. % C, 1-5 wt. % N, 20-30 wt. % O, and 50-60 wt. % Al, based on a total weight of the membrane.

9. The method of claim 1, wherein the alumina support comprises alumina particles having an average size of 1 to 10 μm,
    wherein the alumina particles have a γ form, and
    wherein the alumina particles are dispersed to form a structure with pores having a largest dimension of 0.2 to 3 μm.

10. The method of claim 1, wherein the membrane has pores with a largest dimension of 0.1 to 2 μm.

11. The method of claim 1, wherein the membrane has a porosity of 30-40%.

12. The method of claim 1, wherein the membrane has a water contact angle of less than 5° in air.

13. The method of claim 1, wherein the membrane has an oil contact angle of less than 5° in air.

14. The method of claim 1, wherein the membrane has an underwater oil contact angle greater than 150°.

15. The method of claim 1, wherein the membrane has an underwater oil contact angle of 155° to 165°.

16. The method of claim 1, wherein the membrane has a permeate flux of at least 1,000 L m$^{-2}$h$^{-1}$ at a pressure of 2 bar.

17. The method of claim 1, wherein the membrane has a separation efficiency of at least 95% at a pressure of 0.1 to 5 bar.

18. The method of claim 1, wherein the oil is at least one selected from the group consisting of toluene, hexane, cyclohexane, dichloromethane, plant oil, isooctane, lubricating oil, motor oil, crude oil, diesel oil, and gasoline.

19. The method of claim 1, wherein the oil and water mixture is wastewater, produced water, or seawater after an oil spill.

20. The method of claim 1, further comprising:
mixing an aqueous solution of sodium dodecyl sulfate and the alumina support to form a mixture;
mixing pyrrole in the mixture to form a second mixture; and
adding a polymerization agent to the second mixture to form the membrane.

* * * * *